(12) United States Patent
Bean et al.

(10) Patent No.: US 11,634,938 B2
(45) Date of Patent: Apr. 25, 2023

(54) CONTROL ELEMENTS FOR TRACKING AND MOVEMENT OF FURNITURE AND INTERIOR ARCHITECTURAL ELEMENTS

(71) Applicant: Ori Inc., Boston, MA (US)

(72) Inventors: Chad Bean, Cambridge, MA (US); Carlos Rubio, Boston, MA (US); Hasier Larrea-Tamayo, Cambridge, MA (US); Ivan Fernandez De Casadevante, Cambridge, MA (US)

(73) Assignee: Ori Inc., Boston, MA (US)

( * ) Notice: Subject to any disclaimer, the term of this patent is extended or adjusted under 35 U.S.C. 154(b) by 84 days.

(21) Appl. No.: 16/626,455

(22) PCT Filed: Jun. 21, 2018

(86) PCT No.: PCT/US2018/038742
§ 371 (c)(1),
(2) Date: Dec. 24, 2019

(87) PCT Pub. No.: WO2018/237139
PCT Pub. Date: Dec. 27, 2018

(65) Prior Publication Data
US 2020/0256109 A1 Aug. 13, 2020

Related U.S. Application Data

(60) Provisional application No. 62/523,409, filed on Jun. 22, 2017.

(51) Int. Cl.
*G05B 13/00* (2006.01)
*H02P 6/00* (2016.01)
(Continued)

(52) U.S. Cl.
CPC .............. *E05F 15/605* (2015.01); *E06B 9/70* (2013.01); *G05B 1/02* (2013.01); *G05B 13/00* (2013.01);
(Continued)

(58) Field of Classification Search
CPC ....... E05F 15/605; E05F 15/603; E05F 15/41; G05B 1/02; G05B 13/00; G05B 19/19;
(Continued)

(56) References Cited

U.S. PATENT DOCUMENTS

2004/0207354 A1* 10/2004 Kaplan .................. B25J 9/1638
318/568.11
2009/0301239 A1* 12/2009 Heinrichs ............ A47C 20/041
74/89.37
(Continued)

FOREIGN PATENT DOCUMENTS

CN 103375100 A 10/2013
EP 3091168 A1 11/2016

OTHER PUBLICATIONS

International Search Report and Written Opinion issued in International Application No. PCT/US2018/038742 dated Dec. 18, 2018.
(Continued)

*Primary Examiner* — Kenneth M Lo
*Assistant Examiner* — Mohammed Shafayet
(74) *Attorney, Agent, or Firm* — Goodwin Procter LLP

(57) ABSTRACT

Improved systems and methods for operating moveable architectural elements (e.g., furniture) are described. The system can include improved features implemented throughout various elements, including hardware elements, controller elements, and/or software elements. As one example, the system can feature the ability to map a characteristic load profile across a particular length of actuation and, if during operation a measured load exceeds the profile, adjust (e.g.,
(Continued)

stop) the system's motion. The system can also advantageously map its current draw to increase energy efficiency. In addition, the system can include a positioning system that enables it to automatically determine its position upon start up and during operation. In some implementations, the system includes multiple moveable elements (e.g., furniture items). In some cases, power is distributed to the moveable element(s) using a moveable power distribution module. Many other improvements and features are contemplated and described.

19 Claims, 14 Drawing Sheets

(51) Int. Cl.
    *G05B 1/02*       (2006.01)
    *E06B 9/68*       (2006.01)
    *E05F 15/605*     (2015.01)
    *E06B 9/70*       (2006.01)

(52) U.S. Cl.
    CPC ...... *H02P 6/006* (2013.01); *E06B 2009/6845* (2013.01)

(58) Field of Classification Search
    CPC .. H02P 6/006; H02P 29/0241; H02P 2205/01; E06B 9/70; E06B 2009/6845; E05Y 2900/60; E05Y 2900/142; E05Y 2400/36; E05Y 2900/20; E05Y 2900/132
    USPC ............................................................ 700/28
    See application file for complete search history.

(56) References Cited

U.S. PATENT DOCUMENTS

| | | | |
|---|---|---|---|
| 2010/0250073 A1* | 9/2010 | McCabe | B66F 9/24 701/50 |
| 2012/0206074 A1* | 8/2012 | Kureck | H02P 7/06 318/400.15 |
| 2013/0276373 A1* | 10/2013 | Haab | E05D 15/26 49/506 |
| 2014/0174674 A1 | 6/2014 | Lagarde et al. | |
| 2015/0090507 A1* | 4/2015 | Okada | B66F 9/07568 701/50 |
| 2015/0105940 A1* | 4/2015 | Takase | B62D 57/024 701/1 |
| 2016/0289056 A1* | 10/2016 | Castaneda | B66F 9/24 |
| 2018/0201156 A1* | 7/2018 | Mangette | B66F 17/003 |

OTHER PUBLICATIONS

Francis D,K. Ching et. al.: "A Global History of Architecture, 3rd Edition", Mar. 2017, pp. 739.

* cited by examiner

CONTROL ELEMENTS FOR TRACKING AND MOVEMENT OF FURNITURE AND INTERIOR ARCHITECTURAL ELEMENTS

CROSS REFERENCE TO RELATED APPLICATION

This application claims priority to and the benefit of U.S. Provisional Patent Application No. 62/523,409, filed on Jun. 22, 2017, titled "Control Elements for Tracking and Movement of Furniture and Interior Architectural Elements," the contents of which are incorporated by reference herein in their entirety.

TECHNICAL FIELD

The invention relates generally to apparatuses, systems, and methods for operating moveable architectural elements, and, more specifically, to interior architectural elements (e.g., furniture) that can be moved and transformed in a safe, repeatable, and reliable manner.

BACKGROUND

Motor-operated, modular home and office furniture is becoming more abundant in today's world. For example, office desks provide motorized lifts to raise and lower desks, allowing both standing and sitting workspaces. Other examples include moveable walls in function rooms and conference centers, allowing reconfiguration and resizing to meet specific demands. However, such implementations are designed for industrial environments and do not consider the variety of consumer/residential environments, or other settings in which furniture is typically placed, such as hotel rooms or retail space, or more specialized environments such as hospitals or elder care facilities, or the need for user-friendly controls. Design aspects such as conveniently placed outlets and accessory lighting are overlooked, and the use of plastic or metal cable carriers may provide a robust design, but are not suitable for the everyday home and office environment. As just one example, conventional moving wall systems typically comprise only a moving panel and do not carry electrical power, do not mechanically support other structures, and are not outfitted to allow for modular expansion. In addition, conventional implementations lack a way to manage multiple moving elements without linearly expanding the dimensions of the power distribution system, e.g., three independent moving elements requires three separate cable carriers mounted in a side-by-side fashion. In addition, conventional implementations used in industrial settings are often less sensitive to power consumption than systems implemented in other environments (e.g., residential and office). Non-industrial implementations also require easy-to-use intuitive controls that allow for easy movement, manipulation and transformation of the furniture by non-professionals. Movable furniture also presents a safety hazard as it can collide with humans and/or objects to harmful effect.

Accordingly, there is a need for improved systems and methods for operating moveable furniture and interior architectural items to accommodate its increased usage in non-industrial settings.

SUMMARY

This disclosure describes an improved moveable architectural element system and operating techniques by incorporating features that solve many of the problems in existing moveable furniture items. The improved features are implemented throughout various elements of the system, including hardware elements, controller elements, and/or software elements. As one example, for improved safety, the system can incorporate a controller and/or a processing unit that implements a force mapping module. During an initial movement of the system across a particular surface, a profile can be generated of a typical force on the system. During subsequent movements of the system, the force can be monitored and if it exceeds the profile by a particular amount the motion of the system can be stopped. This can prevent potentially harmful collisions of the system with people, pets, and/or inanimate objects.

Mapping the load profile may enable the system to be implemented and autonomously operated in a wide range of environments, which was not safely feasible in conventional systems. As one example, floors in different living spaces have different friction properties; some have hard woods, some have carpet, some have slight inclines, some have slight declines, etc. As a result, it is very difficult to generate a one-size-fits-all profile that enables the system to be functionally implemented across all desired living spaces (or other environments). If the system uses a static load profile based on a perfectly level surface, the system may mistake an inclined surface in another living space as an impermissible load, causing the system to stop, which would be non-functional for the inhabitant of the inclined surface living space. By incorporating the mapping functionality, the system can generate environment specific profiles, which vastly increases the environments in which it can be installed.

In some implementations, the system can also use mapping for other purposes, e.g., to improve its power consumption/energy efficiency. For example, the system can map an amount of current delivered to its motors during operation and, from this, determine an appropriate amount of current to deliver to the motors during subsequent operations. This can prevent wasting current (improving energy efficiency) and can also result in the system imparting less momentum upon collision with an object. In some instances, the mapped current values can be used to determine if an obstruction has been encountered (e.g., if a measured current value is greater than the mapped value, then an obstruction can be inferred). In other instances, the system can be programmed to move the architectural element according to a desired movement profile (e.g., speed and acceleration) and the system can determine an appropriate amount of current to deliver to the motors in order to accomplish the desired movement profile (e.g., based on torque demands), without the use of mapped current values.

Another example improvement that can be featured by the system is a positioning system that enables the system to automatically determine its position within a particular environment. Awareness of position can be beneficial in that the system can tailor its movement profile depending on where in the environment it is located. For example, if the system is located close to a wall it may move slower than if it is located in the middle of a room. Another improvement that can be featured by the system is modularly distributed power, which can involve using a moveable exit power module to deliver power to moveable elements. This feature can avoid many of the power cable complications and failures encountered in conventional systems.

Yet another improvement featured by the system is the ability to independently move several architectural elements. As just one non-limiting example, a wall can move in one direction and a bed can move in the opposing direction, which can enable a single living space to be converted from a living room into a bedroom, improving livability and functionality for the inhabitants. These improvements and others are described in greater detail below.

In one aspect, the invention relates to a method of operating a moveable architectural element. The method can include the steps of (i) identifying a desired movement profile of the moveable architectural element along a length of actuation; (ii) performing an initial movement of the moveable architectural element along the length of actuation using a motor, the initial movement having the desired movement profile; (iii) measuring and storing a profile of an operation parameter; (iv) upon performing a subsequent movement of the moveable architectural element, measuring an indicator of the operation parameter to determine a measured operation parameter; (v) comparing the measured operation parameter to the profile of the operation parameter; and (vi) if a differential between the measured operation parameter and the profile of the operation parameter exceeds a predetermined threshold, adjusting the subsequent movement of the moveable architectural element.

In various embodiments of the above aspect, the desired movement profile can include a speed profile and/or an acceleration profile. In some instances, the desired movement profile is based on a desired motor parameter profile. Example motor parameter profiles can include a load profile, a speed profile, a voltage profile, a current profile, and/or a pulse width modulation profile. The operation parameter can include a load on the motor, a speed of the motor, a voltage delivered to the motor, a current delivered to the motor, and/or a pulse width modulation delivered to the motor. In cases in which the operation parameter is a load on the motor, the load can be measured as an alignment angle value. The indicator of the operation parameter can be the same or different from the measured parameter.

In various embodiments of the above aspect, adjusting the subsequent movement of the moveable architectural element includes stopping the subsequent movement, reducing a speed of the subsequent movement, and/or reversing a direction of the subsequent movement. The moveable architectural element can include a wall and/or a furniture element. The motor can be an electric DC motor and/or stepper motor. In some implementations, the motor moves the moveable architectural element via a drive wheel and the length of actuation includes a distance over which the drive wheel travels. The length of actuation can include a room surface, e.g., a floor surface, a wall surface, and/or a ceiling surface. In some instances, the operation parameter varies along the length of actuation at least in part because of imperfections (e.g., an incline surface, a decline surface, and variable friction) on the room surface. The method can further include the steps of performing an additional movement of the architectural element along at least a portion of the length of actuation and updating the profile of the operation parameter based on operation parameters measured during the additional movement.

In another aspect, the invention relates to a system for operating a moveable architectural element. The system can include a motor adapted to move the moveable architectural element along a length of actuation, and a controller and/or a data processing apparatus programmed to perform certain operations. The operations can include: (i) obtaining a desired movement profile of the moveable architectural element along a length of actuation; (ii) performing an initial movement of the moveable architectural element along the length of actuation using the motor, the initial movement having the desired movement profile; (iii) measuring a profile of an operation parameter; (iv) upon performing a subsequent movement of the moveable architectural element, measuring an indicator of the operation parameter to determine a measured operation parameter; (v) comparing the measured operation parameter to the profile of the operation parameter; and (vi) if a differential between the measured operation parameter and the profile of the operation parameter exceeds a predetermined threshold, adjusting the subsequent movement of the moveable architectural element. The system can also include a memory unit for storing the profile of the operation parameter.

In various embodiments of the above aspect, the desired movement profile can include a speed profile and/or an acceleration profile. In some instances, the desired movement profile is based on a desired motor parameter profile. Example motor parameter profiles can include a load profile, a speed profile, a voltage profile, a current profile, and/or a pulse width modulation profile. The operation parameter can include a load on the motor, a speed of the motor, a voltage delivered to the motor, a current delivered to the motor, and/or a pulse width modulation delivered to the motor. In cases in which the operation parameter is a load on the motor, the load can be measured as an alignment angle value. The indicator of the operation parameter can be the same or different from the measured parameter.

In various embodiments of the above aspect, adjusting the subsequent movement of the moveable architectural element includes stopping the subsequent movement, reducing a speed of the subsequent movement, and/or reversing a direction of the subsequent movement. The moveable architectural element can include a wall and/or a furniture element. The motor can be an electric DC motor and/or stepper motor. In some implementations, the motor moves the moveable architectural element via a drive wheel and the length of actuation includes a distance over which the drive wheel travels. The length of actuation can include a room surface, e.g., a floor surface, a wall surface, and/or a ceiling surface. In some instances, the operation parameter varies along the length of actuation at least in part because of imperfections (e.g., an incline surface, a decline surface, and variable friction) on the room surface. The operations can further include instructing the motor to perform an additional movement of the architectural element along at least a portion of the length of actuation and updating the profile of the operation parameter based on operation parameters measured during the additional movement.

In another aspect, the invention relates to a method for determining a position of a moveable architectural element relative to a stationary element. The method can include the steps of (i) obtaining properties of a relative position tracking element disposed in fixed relation to the stationary element and including discrete non-repeating portions, the properties including an order of the discrete non-repeating portions and a length of each portion; (ii) sensing the position of the moveable architectural element with respect to a particular portion of the relative position tracking element; and (iii) using the sensed position of the moveable architectural element with respect to the particular portion and the obtained properties to determine a relative position of the moveable architectural element relative to the stationary element.

In various embodiments of the above aspect, the moveable architectural element includes a wall and/or a furniture item. The stationary item can include a housing that functions as a linear guide for the moveable architectural element. The relative position tracking element can include a printed tape and the discrete non-repeating portions can include a pattern of non-repeating colors. The step of obtaining properties of the relative position tracking element can include scanning the relative position tracking element with a sensor assembly that measures the properties. The sensor assembly can be affixed to the moveable architectural element and/or communicate the properties to a microprocessor. In some instances, the step of sensing the position of the moveable architectural element with respect to the particular portion of the relative position tracking element is performed by the sensor assembly that measures the properties. The sensor assembly can include a stable color output that illuminates the printed tape, a color sensor adapted to receive light reflected off of the printed tape, and an incremental positioning system that measures the length of each portion of the relative position tracking element. In some cases, the incremental positioning system includes an encoder and/or a stepper motor (e.g., controlled by an open loop controller).

In various embodiments of the above aspect, the method can also include the steps of determining a distance to an adjacent portion of the relative position tracking element using the incremental positioning system, and based on the distance and the obtained properties, determining an exact position of the moveable architectural element relative to the stationary element. In some cases, the exact position is determined within an accuracy of 5 mm or less. In some cases, the stable color output includes a white LED and the color sensor includes an RGB sensor. In various instances, the obtaining properties step occurs during an initialization phase and the sensing and using steps occur during an operating phase. The sensing and using steps can occur upon start up of a system executing the method. In some implementations, the order of the discrete non-repeating portions encodes information about a system executing the method.

In another aspect, the invention relates to a system for determining a position of a moveable architectural element relative to a stationary element. The system can include a relative position tracking element disposed in fixed relation to the stationary element and having discrete non-repeating portions; a sensor assembly for sensing the position of the moveable architectural element with respect to a particular portion of the relative position tracking element; and one or more data processing apparatus programmed to perform certain operations. The operations can include obtaining properties of the relative position tracking element, the properties including an order of the discrete non-repeating portions and a length of each portion; and using the sensed position of the moveable architectural element with respect to the particular portion and the obtained properties to determine a relative position of the moveable architectural element relative to the stationary element.

In various embodiments of the above aspect, the moveable architectural element includes a wall and/or a furniture item. The stationary item can include a housing that functions as a linear guide for the moveable architectural element. The relative position tracking element can include a printed tape and the discrete non-repeating portions can include a pattern of non-repeating colors. The system can include a second sensor assembly for obtaining the properties of the relative position tracking element by scanning the relative position tracking element. In some cases, the first sensor assembly and the second sensor assembly are the same sensory assembly. In some cases, the second sensor assembly can include a stable color output that illuminates the printed tape, a color sensor adapted to receive light reflected off of the printed tape, and an incremental positioning system the measures the length of each portion of the relative position tracking element. In some cases, the incremental positioning system includes an encoder and/or a stepper motor (e.g., controlled by an open loop controller).

In various embodiments of the above aspect, the operations performed by the data processing apparatus further includes determining a distance to an adjacent portion of the relative position tracking element using the incremental positioning system, and based on the distance and the obtained properties, determining an exact position of the moveable architectural element relative to the stationary element. In some cases, the exact position is determined within an accuracy of 5 mm or less. In some cases, the stable color output includes a white LED and the color sensor includes an RGB sensor. The sensor assembly can be affixed to the moveable architectural element. In some implementations, the order of the discrete non-repeating portions encodes information about the system.

In another aspect, the invention relates to a system for guiding and distributing power to at least one moveable architectural element. The system can include (i) a housing including a track for guiding motion of the at least one moveable architectural element and a power distribution component, (ii) a power entry module adapted to deliver power from a power source to the power distribution component, and (iii) at least one moveable power exit module adapted to deliver power from the power distribution component to the at least one moveable architectural element.

In various embodiments of the above aspect, the power distribution component includes at least one conductive rail. For example, both the track and the power distribution component can include the conductive rail(s). The conductive rails can include an impedance of less than 0.1 ohms. In some instances, the housing also include a polymeric insulating material for insulating the conductive rail. The power source can include an AC power source and/or a DC power source. In some cases, a proximal end of the power exit module is contained within the housing and a distal end of the power exit module extends outside the housing and makes electrical contact with the moveable architectural element. The distal end of the power exit module can make electrical contact with and deliver power to a motor that moves the moveable architectural element. The power exit module and the motor can be attached by a power cord, and the system can further include a strain relief mechanism to limit a force transmitted to the power distribution component.

In various embodiments of the above aspect, the system includes at least two power exit modules and/or at least two moveable architectural elements. In some cases, each moveable architectural element receives power independent of the other moveable architectural elements. The moveable architectural element can include a wall and/or a furniture item. The system can also include a second housing including (i) a second track for guiding motion of the at least one moveable architectural element and (ii) a second power distribution component, and a splice section adapted to attach the housing to the second housing and to connect the track with the second track and the power distribution component with the second power distribution component. The system can also include a mounting mechanism for affixing the system to an existing environment that can include an adhesive strip, a mounting bracket, and/or a high friction material. The existing environment can include a floor surface, a wall surface, and/or a ceiling surface.

In another aspect, the invention relates to a method for guiding and distributing power to at least one moveable architectural element. The method can include the steps of installing a housing having (i) a track for guiding motion of the at least one moveable architectural element and (ii) a power distribution component, and delivering power from a power source through a power distribution component to the at least one moveable architectural element via at least one moveable power exit module.

In various embodiments of the above aspect, the power distribution component includes at least one conductive rail. For example, both the track and the power distribution component can include the conductive rail(s). The conductive rails can include an impedance of less than 0.1 ohms. In some instances, the housing also includes a polymeric insulating material for insulating the conductive rail. The power source can include an AC power source and/or a DC power source. In some cases, a proximal end of the power exit module is contained within the housing and a distal end of the power exit module extends outside the housing and makes electrical contact with the moveable architectural element. The distal end of the power exit module can make electrical contact with and deliver power to a motor that moves the moveable architectural element. The power exit module and the motor can be attached by a power cord, and the method can further include limiting a force transmitted to the power distribution component using a strain relief mechanism.

In various embodiments of the above aspect, the power exit module includes at least two power exit modules and/or the moveable architectural element includes at least two moveable architectural elements. In some cases, the delivering step includes independently delivering power to each of the moveable architectural elements. The moveable architectural element can include a wall and/or a furniture item. The method can also include affixing the system to an existing environment using a mounting mechanism that can include an adhesive strip, a mounting bracket, and/or a high friction material. The existing environment can include a floor surface, a wall surface, and/or a ceiling surface.

In another aspect, the invention relates to a system for moving architectural elements. The system can include a first architectural element movable along a first track defining a first axis and a second architectural element movable along a second track attached to the first architectural element.

In various embodiments of the above aspect, the first architectural element can include a wall and/or a first furniture item, and the second architectural item can include a second furniture item (e.g., a bed, a desk, a couch, a closet, and/or a shelf). In some instances, the first architectural element is moved by a first actuator (e.g., a motor) that receives electrical power from a power source and the second architectural element is moved by a second actuator (e.g., a friction drive) that operates without electrical power. In some cases, both the first and second actuators receive electrical power from a power source. The second track can define a second axis, which can be the same or different than the first axis. As one example, the second axis can be perpendicular to the first axis. In various instances, the first and second architectural elements can move independently of each other or in unison. The first and second architectural elements can be arranged horizontally adjacent to each other, vertically adjacent to each other, and/or nested.

In another aspect, the invention relates to a method of moving architectural element. The method can include moving a first architectural element along a first track defining a first axis, and moving a second architectural element along a second track, the second track being attached to the first architectural element.

In various embodiments of the above aspect, the first architectural element can include a wall and/or a first furniture item, and the second architectural item can include a second furniture item (e.g., a bed, a desk, a couch, a closet, and/or a shelf). In some instances, the first architectural element is moved by a first actuator (e.g., a motor) that receives electrical power from a power source and the second architectural element is moved by a second actuator (e.g., a friction drive) that operates without electrical power. In some cases, both the first and second actuators receive electrical power from a power source. The second track can define a second axis, which can be the same or different than the first axis. As one example, the second axis can be perpendicular to the first axis. In various instances, the steps of moving the first architectural element and moving the second architectural element occur independently of each other or in unison. The first and second architectural elements can be arranged horizontally adjacent to each other, vertically adjacent to each other, and/or nested.

In another aspect, the invention relates to another method of operating a moveable architectural element. The method can include the steps of (i) identifying a desired movement profile of the moveable architectural element along a length of actuation; (ii) performing an initial movement of the moveable architectural element along the length of actuation using a motor, the initial movement having the desired movement profile; (iii) measuring and storing a profile of an operation parameter; (iv) calculating a current profile based on the profile of the operation parameter, where the current profile includes an appropriate amount of current to deliver to the motor along the length of actuation; and (v) upon performing a subsequent movement of the moveable architectural element, delivering current to the motor in accordance with the current profile. In other instances, the system can be programmed to move the architectural element according to a desired movement profile (e.g., speed and acceleration) and the system can determine an appropriate amount of current to deliver to the motors in order to accomplish the desired movement profile (e.g., based on torque demands), without the use of mapped current values.

In various embodiments of the above aspect, the desired movement profile can include a speed profile and/or an acceleration profile. In some instances, the desired movement profile is based on a desired motor parameter profile. Example motor parameter profiles can include a load profile, a speed profile, a voltage profile, a current profile, and/or a pulse width modulation profile. The operation parameter can include a load on the motor, a speed of the motor, a voltage delivered to the motor, a current delivered to the motor, and/or a pulse width modulation delivered to the motor. In cases in which the operation parameter is a load on the motor, the load can be measured as an alignment angle value.

In various embodiments of the above aspect, the moveable architectural element can include a wall and/or a furniture element. The motor can be an electric DC motor and/or stepper motor. In some implementations, the motor moves the moveable architectural element via a drive wheel and the length of actuation includes a distance over which the drive wheel travels. The length of actuation can include a room surface, e.g., a floor surface, a wall surface, and/or a ceiling surface. In some instances, the operation parameter varies along the length of actuation at least in part because of imperfections (e.g., an incline surface, a decline surface, and variable friction) on the room surface. In some instances, the appropriate amount of current is no greater than 110 percent of a minimum amount of current necessary to prevent the motor from stalling. The method can further include the steps of performing an additional movement of the architectural element along at least a portion of the length of actuation, measuring an updated operation parameter profile during performance of the additional movement, and calculating an updated current profile based on the updated operation parameter profile.

In another aspect, the invention relates to another system for operating a moveable architectural element. The system can include a motor adapted to move the moveable architectural element along a length of actuation and a controller and/or a data processing apparatus programmed to perform certain operations. The operations can include (i) obtaining a desired movement profile of the moveable architectural element along a length of actuation; (ii) performing an initial movement of the moveable architectural element along the length of actuation using a motor, the initial movement having the desired movement profile; (iii) measuring and storing a profile of an operation parameter; (iv) calculating a current profile based on the profile of the operation parameter, the current profile comprising an appropriate amount of current to deliver to the motor along the length of actuation; and (v) upon performing a subsequent movement of the moveable architectural element, delivering current to the motor in accordance with the current profile. In other instances, the system can be programmed to move the architectural element according to a desired movement profile (e.g., speed and acceleration) and the system can determine an appropriate amount of current to deliver to the motors in order to accomplish the desired movement profile (e.g., based on torque demands), without the use of mapped current values.

In various embodiments of the above aspect, the desired movement profile can include a speed profile and/or an acceleration profile. In some instances, the desired movement profile is based on a desired motor parameter profile. Example motor parameter profiles can include a load profile, a speed profile, a voltage profile, a current profile, and/or a pulse width modulation profile. The operation parameter can include a load on the motor, a speed of the motor, a voltage delivered to the motor, a current delivered to the motor, and/or a pulse width modulation delivered to the motor. In cases in which the operation parameter is a load on the motor, the load can be measured as an alignment angle value.

In various embodiments of the above aspect, the moveable architectural element can include a wall and/or a furniture element. The motor can be an electric DC motor and/or stepper motor. In some implementations, the motor moves the moveable architectural element via a drive wheel and the length of actuation includes a distance over which the drive wheel travels. The length of actuation can include a room surface, e.g., a floor surface, a wall surface, and/or a ceiling surface. In some instances, the operation parameter varies along the length of actuation at least in part because of imperfections (e.g., an incline surface, a decline surface, and variable friction) on the room surface. In some instances, the appropriate amount of current is no greater than 110 percent of a minimum amount of current necessary to prevent the motor from stalling. In some instances, the operations can further include performing an additional movement of the architectural element along at least a portion of the length of actuation, measuring an updated operation parameter profile during performance of the additional movement, and calculating an updated current profile based on the updated operation parameter profile.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Embodiments of the present invention relate to improved operation and safety of moveable architectural elements. In general, the concepts described herein are applicable to any architectural element, e.g., a wall, furniture (e.g., a bed, a dresser, a desk, etc.), a closet, a shelf, a door, a stage, etc., even if only one type of architectural element is described when illustrating a particular concept. In addition, the concepts described herein are generally applicable to any technique for moving a moveable architectural element, e.g., motor drives, friction drives, magnetic drives, etc., even if only one type of movement technique is described while illustrating a particular concept.

Figure 1:
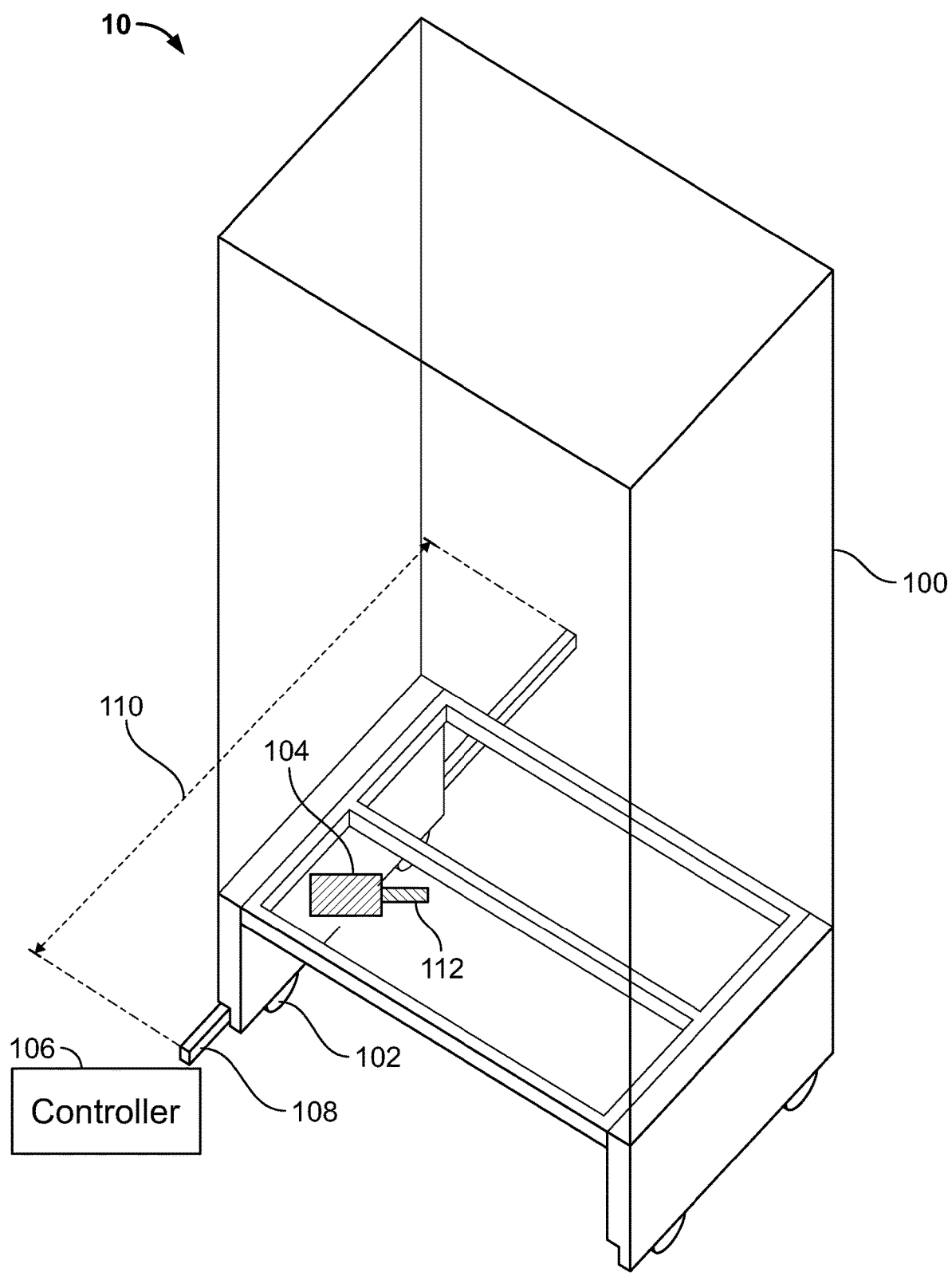
FIG. 1 is a schematic perspective view of a system including a moveable architectural element, according to various embodiments.

FIG. 1 shows an example system 10 that includes a moveable architectural element 100 that is moved by a drive element 102 (e.g., a wheel) driven by a motor 104. The motor can be controlled by a controller 106. The controller 106 can communicate with the motor 104 using any known technique, e.g., locally through a wired connection, via a local area network (LAN) or similar local network, remotely via the internet or other similar network, etc. In some cases, as shown in FIG. 1, the architectural element 100 moves along a length of actuation 110. As used herein, the term length of actuation 110 refers to a distance over which the architectural element 100 travels. In general, the length of actuation 110 can include any surface traversed by the architectural element 100, e.g., a floor surface, a wall surface, a ceiling surface, etc. In some cases, the element 100 is guided along the length of actuation 110 by a track 108 (e.g., a rail, a guide, etc.). Although FIG. 1 shows the track 108 guiding only a single side of the architectural element 100, in other embodiments another side of the element 100 (e.g., the opposing side) can be guided by another track.

Figure 2:
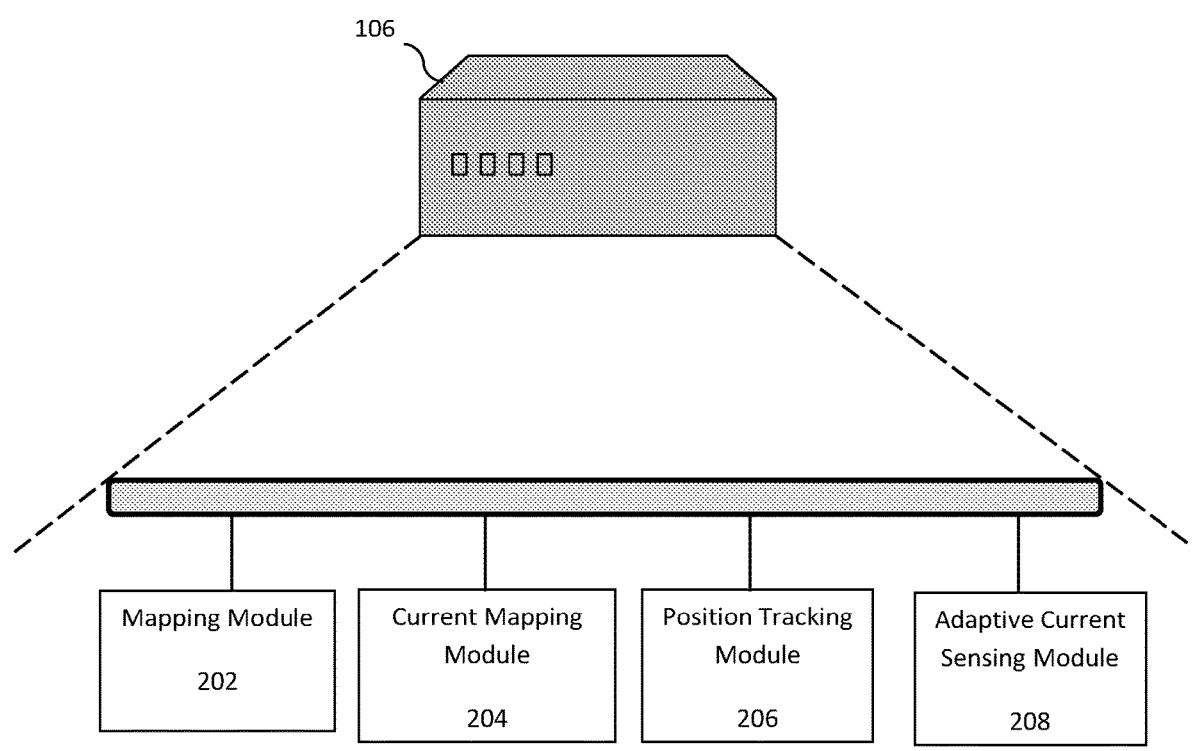
FIG. 2 is a schematic diagram of a controller used to control the moveable architectural element, according to various embodiments.

FIG. 2 is a schematic diagram showing example modules that can be executed by the controller 106. In some instances, the controller 106 executes a mapping module 202. It can be advantageous to generate a map of baseline values of a particular operation parameter of the motor 104 (e.g., a load on the motor 104, a speed of the motor 104, etc.) at various points during movement of the element 100 along the length of actuation 110. For example, an operation parameter measured during operation of the device can be compared against the map of baseline values and, if a disparity is found, some corrective action can be taken (e.g., stopping movement of the element 100). Among other advantages, this can improve system safety by preventing collisions with humans, pets, and/or inanimate objects, for example. The mapping module 202 is primarily described below with respect to motor load and motor speed; however, in general, the mapping module can be implemented to apply to any operation parameter of system 10, e.g., voltage, current, pulse width modulation, etc.

In order to understand the mapping module 202, it is helpful to understand how the motor 104 that provides the force for movement of the drive element 102/architectural element 100 operates. In general, the motor 104 can be any type of motor, e.g., stepper motor, DC electric motor, servo motor, etc., although the below description will primarily focus on embodiments in which the motor 104 is a stepper motor. In some instances, certain parameters of the motor 104 are fixed (e.g., power supply voltages, wheel/gear ratios, etc.) and certain parameters are set by firmware and can be varied (e.g., current, acceleration, speed, etc.).

Stepper motors typically include windings that form magnetic fields when current is flowing and a magnetic rotor that turns to align with the magnetic field. Adjusting the current flowing through different windings creates a turning magnetic field which causes the rotor to spin. The rotor can be attached to a torque transferring mechanism (e.g., a drive shaft) that transfers torque to the drive element 102 resulting in movement of the architectural element 100. As will be understood by those skilled in the art, in order to generate torque to spin the rotor (e.g., to move the element 100), the motor 104 needs to overcome forces that are counteracting that motion. Taking the example of the architectural element 100, those forces are often the static frictional forces imposed by the surface upon which the element 100 travels. However, many additional counteracting forces are possible, e.g., an object or a person blocking the element's movement. In general, the sum of all of the forces counteracting motion of the element 100 is the load on the motor 104.

In general, disregarding the energy dissipation from the current flowing through the windings, when the motor 104 is not driving a significant load, the rotor keeps up closely with the magnetic field, and the "alignment angle" (angle between the rotor and the stator tooth generating the magnetic field) is small. When the rotor and the magnetic field are aligned, no torque is being transferred to the rotor, no power is being expended, and the load on the motor 104 is minimal (e.g, 0 N). Conversely, when the motor is driving a significant load, the gap between the magnetic field and the rotor widens, and the alignment angle increases. When the rotor and magnetic field are maximally separated, full torque is being transferred to the rotor, maximum power is being expended to move the rotor, and the load on the motor 104 is at a maximum. If the alignment angle exceeds a particular threshold value then the motor 104 stalls.

In many conventional applications, stepper motors 104 experience a relatively constant load during operation. Such conventional systems can be pre-programmed with a threshold load value that if exceeded during operation can result in shutting down or reversing the motor. One example of such a system is found in many conventional garage doors, which are pre-programmed with a particular threshold load. If that load is exceeded during operation, the system assumes that it has collided with something and either shuts off or reverses the motor.

Pre-programming a threshold load value is not always practical for the system 10 described herein, because the load experienced by the system 10 can vary so greatly across various installations of the system 10. For example, the load can vary based on travel surface material (e.g., hardwood vs. tile vs. carpet, etc.), incline surfaces and/or decline surfaces, frictional coatings (e.g., lacquer, grout, etc.), etc. As a result, a threshold load value that may be appropriate to indicate an obstruction or other safety violation in one installation might be inappropriate in another installation. For example, the threshold load value appropriate for a system 10 installed on a flat hardwood surface might be exceeded upon any motion of a system 10 installed on an inclined carpet surface, resulting in undesired disruption of the inclined carpet surface system. The mapping module 202 executed by the controller 106 can enable the system 10 to be operable across any installation, while still maintaining the safety benefits of having a threshold load value.

Figure 3:
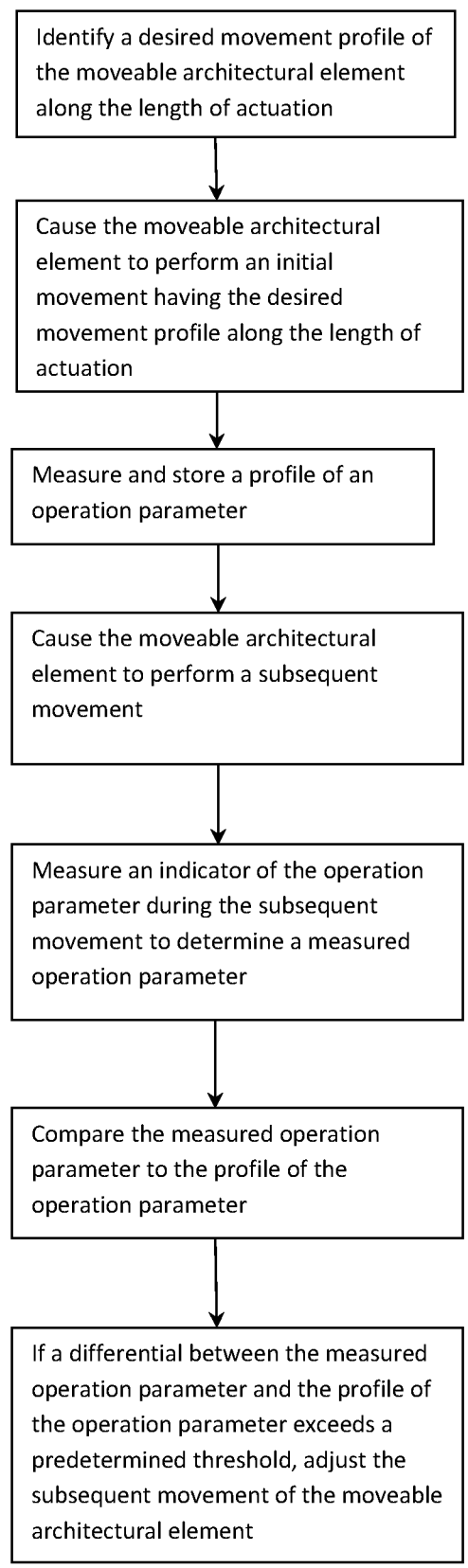
FIG. 3 is a flow chart of example operations performed by a mapping module of the controller, according to various embodiments.

FIG. 3 is a flow chart showing example operations performed by the mapping module 202. In some instances, the operations can include identifying a desired movement profile of the moveable architectural element 100 along the length of actuation 110. The controller 106 can identify the desired movement profile using any known technique, e.g., it can be pre-programmed, received from a user input (either on a local user interface or through a web portal in communication with the controller 106), via a machine learning process, etc. As used herein, movement profile refers to values for a parameter that describes or defines motion of the architectural element 100 at all or some locations along the length of actuation 110. The movement profile can be constant or variable, in various instances. In general, the movement parameter profile can be of any desirable movement parameter. For example, the movement parameter profile can include a desired speed profile, a desired acceleration profile, etc. In some cases, the desired movement profile is based on a desired motor parameter profile. As used herein, a motor parameter profile refers to values for a parameter that describes or defines operation of the motor 104. In general, the motor parameter profile can be of any desirable motor parameter. For example, a desired load profile, a desired speed profile, a desired voltage profile, a desired current profile, a desired pulse width modulation profile, etc.

Once the desired movement profile is identified, the controller 106 can cause the moveable architectural element 100 to perform an initial movement having the desired movement profile along the length of actuation 110. For example, the controller 106 can control the motor 104 such that the architectural element 100 moves across the length of actuation 110 having a particular speed profile and acceleration profile. During the initial movement, an operation parameter can be measured at various locations along the length of actuation so that an operation parameter profile is generated. Any suitable number of measurements can be collected. For example, an example stepper motor 104 can step the motor through 51200 steps per revolution, or in increments of about 0.007 degrees. In some cases, a measurement can be collected at each step (e.g., cases that include dedicated circuitry for processing measurements); however, in other cases mapping the parameter at all 51200 steps is impractical, especially without dedicated circuitry. In addition performing and storing that many measurements can exceed the storage capacity and processing capability of many stepper motors and controllers. Even in implementations that include storage capacity and processing capability to handle this many measurements, the inventors have determined that, in some cases, performing measurements at such a high resolution may not provide noticeably or practically better results than performing measures at a lower resolution. The inventors have determined that, in various implementations, acceptable results can be achieved by performing measurements at the following angular resolutions: in a range from 1 degree to 45 degrees, 2 degrees to 40 degrees, 3 degrees to 35 degrees, 4 degrees to 30 degrees, 5 degrees to 25 degrees (e.g., 7.2 degrees), 7 degrees to 20 degrees (e.g., 7.2 degrees), 8 degrees to 15 degrees, and 9 degrees to 10 degrees. For example, if measurements are performed at an angular resolution of 7.2 degrees, that means that a measurement is collected each time the rotor rotates 7.2 degrees.

In some instances, if the sensor collects more than one measurement within the programmed angular resolution (e.g., more than one measurement within a particular 7.2 degree rotation), the additional measurement can be treated in a variety of ways, e.g., only the first measured value is used (which can save computation time), only the second measured value is used, an average value is used, both values are used (resolution changes), etc. Similarly, if the sensor misses a measurement within the programmed resolution (e.g., no measurement is collected within a particular 7.2 degree rotation), this can be handled in a variety of ways in order to continue reliable operation, e.g., the missing value can be extrapolated from other measured values.

As mentioned above, the operation parameter can include, e.g., load on the motor 104, speed of the motor 104, voltage draw, current draw, pulse width modulation, etc. The operation parameter can be measured using any suitable instrument/technique, e.g., a sensor and/or data processing chip attached to the motor 104. In some instances, rather than directly measuring the operation parameter of interest, the operation parameter is indirectly measured by measuring an indicator of the operation parameter (e.g., a value from which the operation parameter can be determined). Taking the example of the operation parameter being a load on the motor 104, in some cases, rather than directly measuring the load, the system 10 can measure the alignment angle of the motor 104, which can be used to calculate (or estimate) the load. In this example, the alignment angle itself can be measured by determining the ratio of input power to output power. In some embodiments, the motor 104 can include a register that measures and outputs power efficiency, from which alignment angle can be determined, from which load on the motor 104 can be determined. The controller 106 can be preprogrammed with these calculations, such that for each measurement of power efficiency a corresponding load on the motor 104 is calculated (e.g., a maximum power efficiency reading (e.g., 0) can represent maximum load (or stall) and a minimum power efficiency reading (e.g., 1024) can represent minimum load). As will be understood by those of skill in the art, many other examples are possible for the indirect measurement of the various operational parameters of interest, all of which are contemplated herein.

As another example from mapping load on the motor 104, in some instances the system monitors the load and alters the speed of the motor accordingly (e.g., slows the motor down if the load increases and speeds it back up to the desired speed if the load decreases). This technique can enable keeping the current and torque low while allowing operation in a wide range of floors, e.g., because the motor 104 can use the element's inertia to help it travel areas of increased friction (e.g., inclines) as opposed to trying to maintain a constant higher speed and stalling. In some such instances, because changing the speed changes the alignment angle (e.g., trying to keep the alignment angle small), the load variable can be unusable for mapping. In such instances, the mapped operation parameter can be speed (which can represent load).

In various embodiments, the operation parameters measured during the initial movement can be stored in a memory accessible by the controller 106. The memory can be located in any suitable location, e.g., locally on the motor 104, locally on the controller 106, wirelessly accessible via the internet/cloud, etc. In various instances, the operation parameter profile can be based on the measurements collected during only the initial movement, or it can be based on multiple initial "profile generating" movements. Any number of initial "profile generating" movements can be used. For example, the profile can be generated based on a movement of the architectural element 100 across the length of actuation 110 in a first direction and a movement of the architectural element back across the length of actuation in the opposite direction. In some instances, the controller 106 tracks the direction in which the architectural element 100 is moving and separate profiles are stored for each direction of travel.

After the operation parameter profile is collected and stored, the mapping module 202 can include the operation of causing the moveable architectural element 100 to perform a subsequent movement. The subsequent movement can be, for example, during use of the device by a user (e.g., moving the moveable architectural element 100 to convert a living room into a bedroom, etc.). During the subsequent movement, the system 10 (e.g., a sensor on the motor 10, the controller 106, etc.) can perform measurements of the operation parameter, or in some cases an indicator of the operation parameter. The measurements during the subsequent operation can be at the same or a different resolution than the measurements performed during the initial mapping step. Similarly, the measurements during subsequent operation can be of the same value or a different value than the measurements performed during the initial mapping step. For example, during the initial mapping step, load on the motor may be measured directly, while during the subsequent operation load on the motor is determined via a power efficiency reading. In other cases, load on the motor can be determined via a power efficiency reading during both the initial and subsequent movements.

The mapping module 202 can perform the operation of comparing the measured operation parameter value to an appropriate value on the operation parameter profile. The appropriate value can be a value that corresponds (e.g., same location, same time, etc.) to the measured value. If the mapping module 202 determines that a differential between the measured value and the profile value exceeds a predetermined (e.g., preprogrammed) threshold, then the controller 106 can adjust the movement of the architectural element 100. In general, any predetermined threshold can be used, e.g., 1% of the profile value, 2% of the profile value, 3% of the profile value, 5% of the profile value, 10% of the profile value, 15% of the profile value, 20% of the profile value, etc. If the threshold is exceeded, the controller 106 can infer that an obstruction has been encountered (e.g., a person, a pet, an inanimate object, a mechanical failure of the system 10, an electric failure of the system 10, etc.).

In some instances, a single threshold-exceeding value results in an inference of an obstruction. In other instances, the system does not infer an obstruction until a predetermined number of threshold-exceeding values (e.g., 2, 3, 5, 10, 50, 100) occur, either consecutively or within a particular number of measurements. In instances in which a predetermined number of threshold-exceeding values must occur consecutively in order to infer an obstruction, if a non-threshold-exceeding value is measured before the predetermined number is reached, then the count can be reset to zero. In other implementations, in addition to or as an alternative from tracking the number of threshold-exceeding measurements, the system 10 can track an amount over the threshold of a particular measurement. In some instances, the system 10 can accumulate the amounts over the threshold of consecutive measurements (or within a particular number of measurements) and infers an obstruction if the accumulated amount exceeds a predetermined amount. In such instances, if a non-threshold exceeding value is measured before the predetermined amount is reached, then the accumulated amount can be returned to zero. In some cases, the system 10 can accumulate the amount over the mapped profile, as opposed to the amount over the threshold. In various implementations, the count or accumulated amount can be reset either during motion or after motion has stopped. In some instances, the count of accumulated amount is not reset to zero, but rather is reset gradually. The rate at which the count or accumulated amount is reset can depend on a number of factors, e.g., the size of the differential between the threshold (or profile) and the measured valued, the number of measurements taken, etc.

Any adjustment to movement of the architectural element 100 can be made, e.g., to improve system safety, to improve energy efficiency, etc. For example, the motion can be stopped or slowed or the direction of the motion can be reversed, e.g., to prevent further collision. In some instances, actions other than adjusting a movement of the architectural element 100 can be taken. As a few of many examples, the system can run a diagnostic check on its mechanical and/or electric systems to ensure proper functioning, the profile can be updated (described below), a service technician can be called or other notification action be taken, etc.

In various embodiments, there are additional considerations and limitations that can be addressed in designing and implementing the mapping module 202. One example consideration is at what points along the length of actuation 110 and/or at what times during movement of the architectural element 100 should mapping and/or analysis of measurements against a profile occur. In some instances, mapping/analysis occurs when the system 10 has reached a steady or constant speed or acceleration (or other motion parameter). In such instances, mapping/analysis does not occur when the system is in an initial acceleration or final deceleration phase. Instead, it can occur when, given the desired speed and acceleration profile, the system has reached the desired speed, as the map should uniformly represent the steady state speed/operation. In some cases, values when the system 10 is performing an initial acceleration or final deceleration are unsteady and/or unreliable and may result in false positive or false negative readings. In other instances, mapping/analysis can occur during the initial acceleration and final deceleration stages.

In various embodiments, signal noise, whether from mechanical or electrical sources, can be accounted for and, in some cases, mitigated. In general, any known technique or computational resource for accounting for noise can be used, e.g., a sliding median filter with an appropriate window size (e.g., 15, 20, 25, 50, 100). As used herein, window size refers to a number of measurements considered aggregately to account for noise. For example, when a window size of 25 is used, rather than using a single value for each measurement, the controller 106 can look at the last 25 values and use the average or median of those as the measurement. Many other signal processing techniques are available for accounting for noise. The same or different techniques can be used during the mapping and analysis phases, or in some cases a signal processing technique may only be used in one phase or the other.

In various embodiments, the mapped profile can be updated. In general, the profile can be updated at any interval and according to any condition or pattern, e.g., every time the architectural element 100 moves, every time the system is powered on and/or off, only once during the system's lifetime, every time there is and/or is not an obstruction event. Updating the profile can include replacing at least one measurement/value in the profile with an updated measurement/value. For example, all of the measurements/values can be updated, or only a predetermined (e.g. 1, 2, 3, 10, 25, 50, 100) measurements/values on either side of a collision event can be updated. The updated measurement/value can be a filtered measurement (e.g., using the sliding median filter), an unfiltered measurement, an average of the filtered measurement and the original measurement, an average of the unfiltered measurement and the original measurement, an average of multiple measurements since the original measurement, a median of multiple measurements since the original measurement, etc. In general, any number of measurements/values in the profile can be updated/replaced, e.g., all of the measurements/values, only measurements/values for which an updated measurement exceeds a particular differential threshold, only the measurements/values within a particular distance or time of a collision event, etc.

In various implementations, the controller 106 can automatically update/tune the threshold values used to infer an obstruction event. For example, at any time (e.g., before updating the profile with the most recent values), the controller 106 can compare a prior movement (e.g., the most recent movement without an obstruction inference) with the profile and identify thresholds (e.g., a top and bottom threshold) that provide the smallest/tightest bounds that do not trigger an obstruction. The thresholds can then be set to these values (or in some cases with an added overhead), e.g., so that the system 10 provides a faster stop with lower obstruction force. Updating of thresholds can occur at any advantageous time, e.g., after every movement of the element, after every movement of a particular length (e.g., with a sufficient amount of data, but that is likely to occur with a desired frequency). In general, any concept for updating the profile described above or elsewhere herein can be applicable to updating the thresholds. For example, the threshold can be updated at any interval and according to any condition or pattern, e.g., every time the architectural element 100 moves, every time the system is powered on and/or off, only once during the system's lifetime, every time there is and/or is not an obstruction event.

In some implementations, the motor 104 includes a dedicated microcontroller 112 that is located locally on the motor 104. In general, unless otherwise stated herein, any function performed by the controller 106 can, in some instances, be performed by the microcontroller 112. The microcontroller 112 can include either updateable or fixed firmware. In instances in which the microcontroller 112 has fixed firmware, the master controller 106 can be updated via a wired (USB, etc.) and/or wireless (e.g., internet, LAN, etc.) connection. In various implementations, either the controller 106 or the microcontroller 112 can perform the threshold updates discussed above. In instances in which the controller 106 performs the updates, the controller 106 can perform the analysis remotely and/or instruct the microcontroller 112. In some cases, the controller 106 can instruct the microcontroller 112 to switch between various modes of operation. In various implementations, the system 10 can include multiple motors 104 and/or microcontroller 112 (e.g., in systems with multiple moveable elements 100 or a single moveable element). In such implementations, some or all of the microcontrollers 112 can be controlled by the master controller 106.

In some implementations, it is advantageous for the system to avoid false positives (e.g., when movement of the element 100 is stopped because the system 10 infers an obstruction when no obstruction exists) and false negatives (e.g., when a collision occurs but the system 10 does not detect it). Example conditions that cause false positives include: the element 100 being pushed manually so its position is offset in the map, increases in weight on the element 100 between different movements, mechanical defects, threshold parameters that are too low, etc. The controller 106 can overcome a false positive using various techniques. For example, following a false positive event, the controller 106 can erase the mapped profile and/or retune the threshold parameters. In general, any suitable action can cause the controller 106 to perform these actions, e.g., occurrence of an identified false positive, a stall occurring on the first run since a power up in either or both directions, a stall occurring twice in a row in either the same or in opposite directions, etc.

In some implementations, rather than changing speed based on the load, the system 10 can change an amount of current delivered to the motor 104 based on load (or, in some cases, another measured parameter). For example, when the load on the motor 104 decreases, the current delivered to the motor 104 can decrease and when the load on the motor 104 increases, the current delivered to the motor 104 can increase. This mode of operation can allow the system 10 to be energy efficient. In some cases, this mode of operation is available when plentiful sources of reserve current are available. Monitoring current draw can also ensure that the motor 104 and/or other electrical components do not overheat. In some implementations, selective delivery and monitoring of current draw is performed by a current mapping module 204 executed by the controller 106 (or a microcontroller 112).

Figure 4:
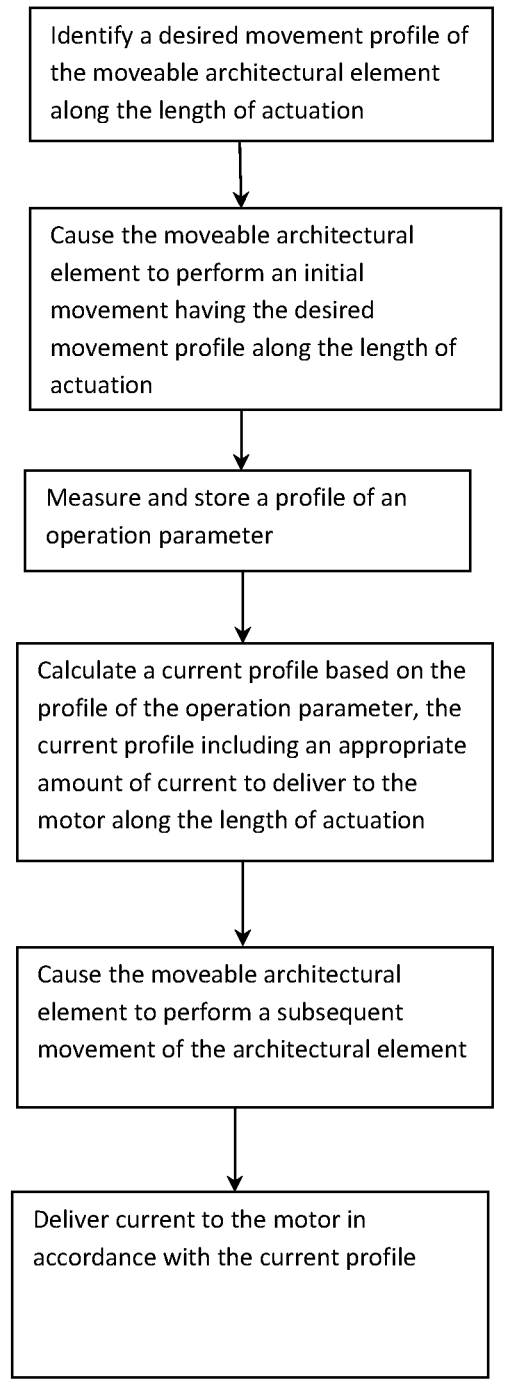
FIG. 4 is a flow chart of example operations performed by a current mapping module, according to various embodiments.

FIG. 4 is a flow chart of example operations performed by the current mapping module 204. As shown, many of the operations performed by the current mapping module 204 are the same as those performed by the mapping module 202. As such, in some cases, the current mapping module 204 is a sub-module of the mapping module 202. The current mapping module 204 can calculate a current profile based on a mapped profile of an operation parameter. The current profile can include an appropriate amount of current to deliver to the motor 104 along the length of actuation. Upon subsequent movement(s) of the architectural element 100, the module 204 can deliver current to the motor 104 in accordance with the current profile. In general, any appropriate amount of current can be delivered; for example, no more than 101%, 103%, 105%, 110%, 115%, 120%, or 125% of the current needed to prevent the motor from stalling. In other instances, the system 10 can be programmed to move the architectural element according to a desired movement profile (e.g., speed and acceleration) and the system 10 can determine an appropriate amount of current to deliver to the motors in order to accomplish the desired movement profile (e.g., based on torque demands), without the use of mapped current values. In some implementations, the operation parameter itself is current draw and, for example, the system 10 can infer an obstruction event if the amount of current draw is increased.

In some motors (e.g., DC motors), voltage correlates to the speed at which the motor turns, and current correlates with the torque that the motor outputs. When a voltage is applied to a motor, the motor will attempt to draw the current that it needs to generate the torque it needs to reach the speed aligned with that voltage. In some instances, this means that at standstill the motor 104 draws a large current to get the rotor spinning, and the current draw drops off precipitously once the motor is spinning and continues to drop as it approaches the steady state speed.

In some embodiments, the controller 106 (or the microcontroller 112) can execute an adaptive current sensing module 208. The adaptive current sensing module 208 is similar to the current mapping module in that both modules monitor the amount of current delivered to the motor. However, rather than comparing the measured current value to a value mapped for that location during a prior movement of the architectural element 100 across the length of actuation 110 (e.g., like the current mapping module 204), the adaptive current sensing module 208 compares the measured current value to a previously measured value at a different location during the same movement. In some instances, the adaptive current sensing module 208 compares the measured current value to a baseline amount, e.g., calculated as the average of previous current measurements (e.g., all previous measurements during that movement or a predetermined previous number of measurements, e.g., 2, 3, 5, 10, 50, 100, etc.). If the amount of current draw changes by a predetermined amount (e.g., 5%, 10%, 20%, 30%, 50%, 100%, or any other amount characteristic of the architectural element encountering an obstruction), within a predetermined amount of time (e.g., 1 μs, 1 ms, 5 ms, 10 ms, 0.3 s, 0.5 s, 1 s, 2 s, etc.) and/or a predetermined number of measurements (e.g., 1, 2, 5, 10, etc.) and/or a predetermined number of motor steps, then the adaptive current sensing module 208 can take some corrective action (e.g., stopping, slowing, and/or reversing the movement of element 100). As one non-limiting example, provided solely for the purpose of illustrating the concept, if the adaptive current sensing module 208 receives a current measurement that is 20% greater than the average of all the previous current measurements during a particular movement, the module 208 can infer that an obstruction has occurred and take some corrective action. In some instances, the adaptive current sensing module 208 can be advantageously used with a non-stepper DC motor.

Figure 5:
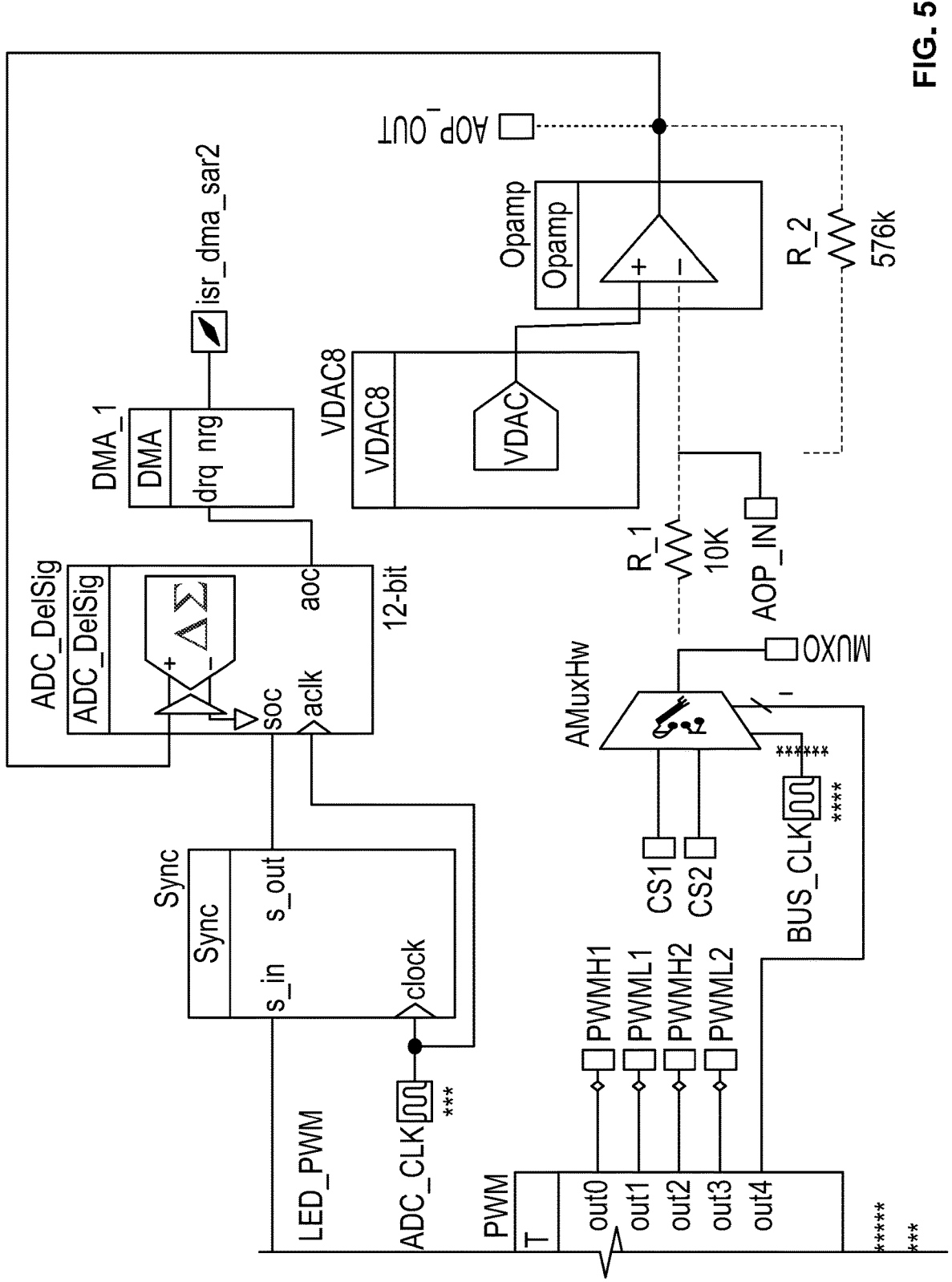
FIG. 5 is an electrical schematic for a motor, according to various embodiments.

In some embodiments that monitor current draw, current-sense resistors are placed on each lower leg of an H-bridge that drives the motor 104, as shown for example in FIG. 5. In such embodiments, when the motor 104 drives in one direction, the current flows through one leg, and when the motor drives in the other direction, the current flows through the other leg. With voltage being equal to current times resistance, if the resistance of the resistors is known, current can be calculated by measuring the voltage across the resistors. In some instances, the top of each resistor is connected to a hardware multiplexer, which passes the top of the resistor with current flowing through it as a result of the direction that the motor 104 is spinning. This output can be connected to the inverting input of an operational amplifier via another resistor, and the non-inverting input is set by a voltage digital-to-analog converter that outputs a steady voltage. The inverting input can be connected to the output via another resistor. The output can be connected to an analog-to-digital converter, which converts the voltage into an integer. The microcontroller 112 or controller 106 can then operate on this integer to determine the current flowing through the motor 104 (e.g., in milliamps). Many other techniques for measuring current draw are possible and contemplated.

All of the data processing techniques described above with respect to other operation parameters are applicable to measurements of current draw. In some embodiments, the controller 106 (or a memory accessible thereby) can store a predetermined number of current measurements (e.g., the last 5, 10, 25, 50, 100), and each time a new value is measured, the oldest value can be dropped in favor of the new value. The average of the stored values can then be calculated and used as the current measurement. In some cases, the current measurement is compared to a "static high threshold." If the current measurement exceeds the static high threshold for a predetermined amount time (e.g., milliseconds), the overcurrent detector is tripped, and the microcontroller stops the motor. The static high threshold may be a value that is reached if the motor 104 is unable to reach a predetermined speed in a predetermined amount of time, e.g., indicating that an object is blocking movement of the element 100. While the element 100 is in motion, the controller 106 can compare the current measurement to a "moving high threshold." The moving high threshold can be a static number lower than the static high threshold. Similar to the static situation, if the current measurement exceeds the moving high threshold for a predetermined amount of time (e.g., milliseconds) while the system 10 is in motion, the overcurrent detector is tripped and the motor is stopped.

In addition to the moving high threshold and static high threshold, the controller 106 can also maintain a baseline value to which the current measurement is compared (e.g., the mapped profile value). The baseline can vary. In some cases, the baseline closely follows the current measurement values, but more slowly, adapting to the readings over time as a moving average, which can allow the controller 106 to compare the base value against an instantaneous value and determine if a collision has occurred.

The baseline can be continually or periodically updated, or in some cases not updated. An example technique for updating the baseline includes subtracting the baseline from the current measurement, and if the difference is positive but lower than an "update threshold" for a predetermined amount of time (e.g., milliseconds), the baseline updates (e.g., via a jitter filter, which can include incrementing the baseline by one, rather than a calculated value). In some instances, the system can differentiate between normal variations (e.g., drift) in current readings, which can be used to update the baseline, and an abnormal variation that represents an obstruction condition, which may not be used to update the baseline. If the difference is negative for a predetermined amount of time (e.g., milliseconds), the baseline can also update downwards (e.g., via a jitter filter, which can include decrementing the baseline by one). The update threshold used to update the baseline can be a value that is lower than the threshold used for adjusting (e.g., stopping) the movement of the element 100.

As mentioned above with respect to other operation parameter measurements, in some embodiments, the current measurements can be unstable during certain portions of the element's movement. For example, the measurements can be unstable during the spin up period of motion, in which the motor goes from standstill to some amount of angular speed. The current may initially spike for a few milliseconds, then come down precipitously, then increase again, and as the current levels off downwards there can be significant noise and variance in the readings. As another example, the measurements can be unstable during operation if the system decelerates and/or accelerates, and in some instances the additional current draw required by the acceleration can be considered a collision resulting in a false positive. In order to combat these complications, in some instances, the controller 106 can apply an algorithm to determine the stability of the current readings. In such instances, if the current readings are not determined to be stable, then threshold-exceeding measurements can be ignored. In such instances, the thresholds are only applicable to stable measurements.

In general, any technique can be used to determine the stability of the current measurements. As one example, the current measurements are considered stable once the following two conditions are met for a predetermined amount of time (e.g., milliseconds): (1) the threshold value for too much current being delivered is not exceeded and (2) the upwards rate of change of the pulse width modulation (PWM) on the motor is below a threshold rate value. In some cases, if the current readings are stable, but the PWM starts to increase at a rate above the threshold rate value, the current readings will again be considered unstable. In some cases, the baseline is set to the current measurement when the measurements transition from unstable to stable, e.g., to get the most robust and accurate detection.

In some implementations, the controller 106 ensures that initial acceleration is slow enough to avoid stall and slows the motor 104 down if more torque is required to move in one direction. Additionally, if the system does become blocked (e.g., due to a collision), the controller 106 can stop the motor 104 before it reaches a stall state, which helps manage torque and speed requirements. A stall state can exist when the motor 104 is unable to supply enough torque to keep the rotor spinning. When this happens, the magnetic field continues to rotate inside the motor, but the rotor does not spin, which can cause a loud noise.

Another aspect of the invention relates to determining a position of the architectural element 100 along the length of actuation 110. Knowing the position (or an approximate position) of the element 100 can be advantageous for numerous reasons including, for example, adjusting the motion of the element 100 (e.g., slower when closer to walls or ends of the length of actuation 110, to avoid abrupt stoppages which can damage the system 10 and/or result in items falling off of element 100 due to inertial forces).

Figure 6:
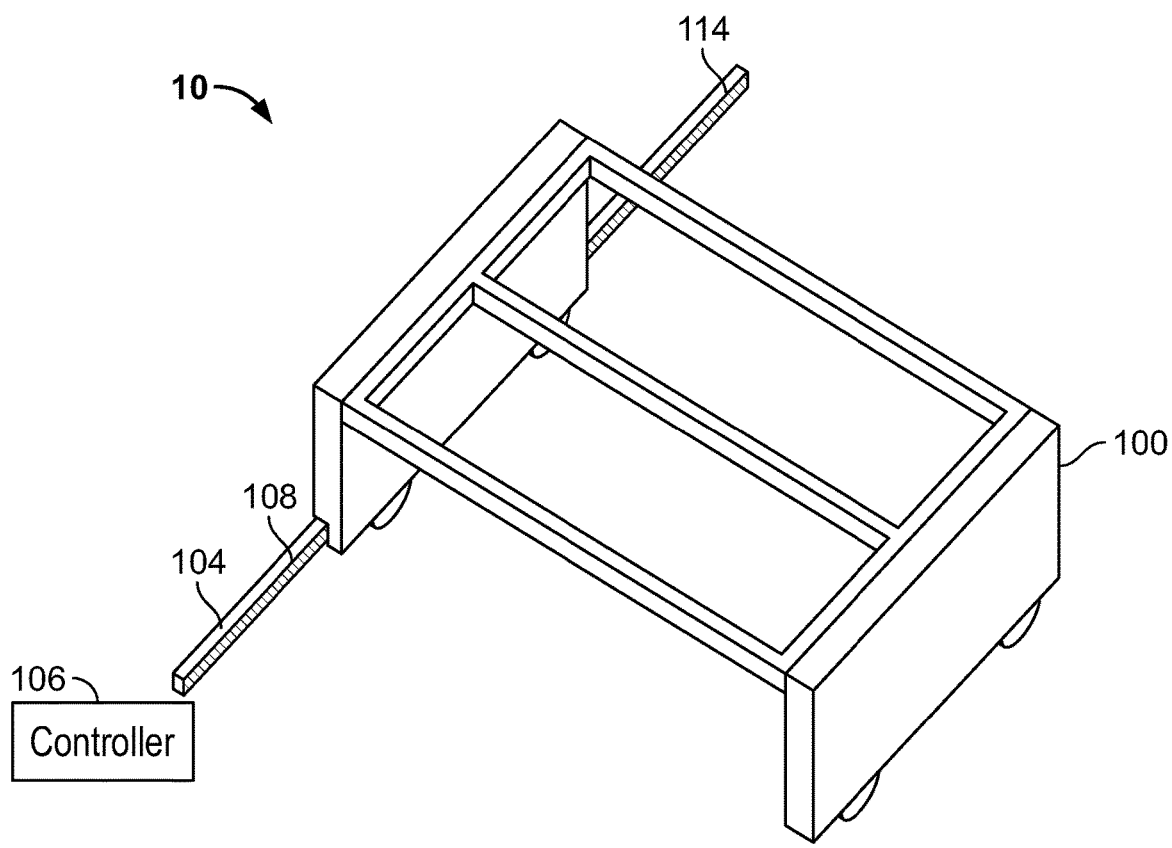
FIG. 6 is a schematic perspective view of a system including a position tracking element, according to various embodiments.

In various embodiments, the system 10 can include a position tracking element 114 (see FIG. 6) and the controller 106 can include a position tracking module 206 (see FIG. 2). In general, the position tracking element 114 can be located at any suitable location on the system 10, not just along the track 108 as shown in FIG. 6.

Figure 7:
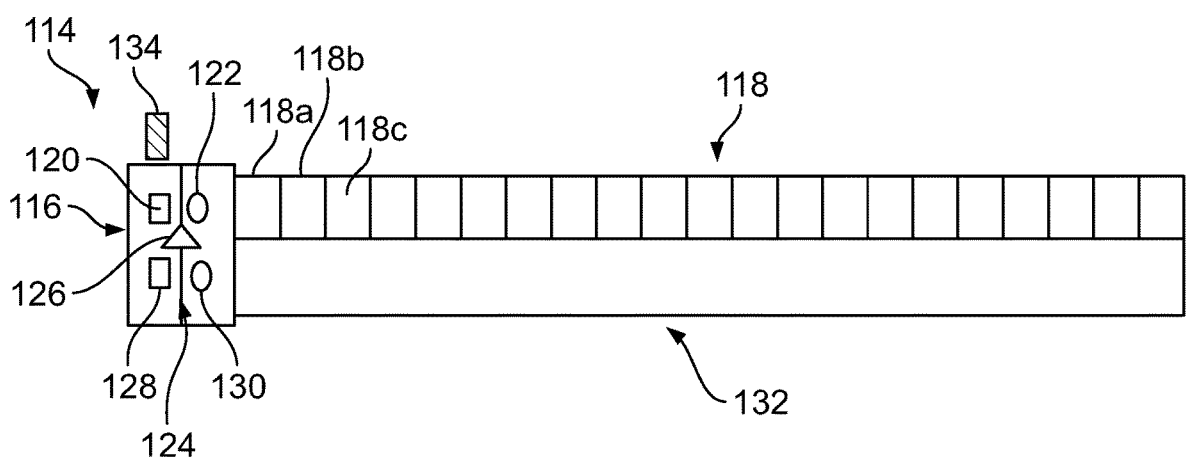
FIG. 7 is a schematic diagram of the position tracking element, according to various embodiments.

FIG. 7 is a schematic diagram showing an example position tracking element 114. The element 114 can include a sensor component 116 and a sensed component 118 (sometimes referred to herein as a relative position tracking element). In general, the sensed component 118 can be any element that conveys information regarding location with respect to the track 108 (or other suitable structural element that can serve as a fixed point of reference). As one example, the sensed component 118 can include a surface with indicia that can be used to indicate a location, for example, a printed tape with discrete colored portions 118a, 118b, 118c, etc., which in some cases are non-repeating. In order for the printed tape 118 to convey location with respect to the track 108, in some cases, the printed tape 118 is mounted in fixed relation to the track 108. In some cases, that printed tape 118 is housed within the track 108 (or a housing that contains the track 108) and can block all, substantially all, a majority of, or some ambient light from illuminating the printed tape 118.

In various embodiments, the sensor component 116 is configured to move with respect to the sensed component 118. For example, the sensed component can be mounted in fixed relation to the architectural element 100, such that as the element 100 moves along the track 108, the sensor component 116 move along the sensed component 118. In general, the sensor component 116 can be any type of sensor capable of sensing an environment (e.g., some property of the sensed component 118), e.g., an optical sensor, a thermal sensor, etc. In one example embodiment, the sensor component 118 includes a light source 120 (e.g., a white LED with a stable color output) positioned and adapted to illuminate the printed tape 118. The sensor component can also include a color sensor 122 (e.g., an RGB color sensor), an incremental positioning system 124, a microprocessor 134, and a printed wiring board. In operation, the color sensor 122 can receive light from the light source 120 reflected off a particular portion of the sensed component 118 located proximate the sensor component 118, such that the color sensor 122 can determine the color of the particular portion. The color can then be communicated to the microprocessor in any suitable format, e.g., with at least 4-bits, 8-bits, 16-bits, 32-bits, etc. of resolution for each color.

In various embodiments, the incremental positioning system 124 tracks the linear position of the sensor component 118 with a predetermined resolution, e.g., 1 mm, 2 mm, 3 mm, 5 mm, 10 mm, 25 mm, 50 mm, 100 mm. One example of an incremental positioning system 124 includes an incremental mechanical rotary encoder 126 and an infrared sensor 128 coupled with an infrared emitter 130 that reflects off of infrared detectable indices 132 (e.g., white and black lines/portions). In some implementations, the microprocessor 134 tracks the position of the sensor component 116/ architectural element 100 with respect to the track 108 and stores the position, e.g., in a non-volatile memory. If the system 10 is powered down, the microprocessor can recall the element's position when the system is powered up again, in some cases, even if the location of the element 100 changed when the system was powered down.

In certain embodiments, the microprocessor 134 can store the configuration of the sensed component, e.g., the printed tape 118. For example, the microprocessor 134 can store the order of the discrete portions (e.g., non-repeating color portions) and the length of each portion. In some cases, the microprocessor 134 is pre-programmed with this information. In other cases, the microprocessor 134 performs a programming function to determine this information.

Figure 8:
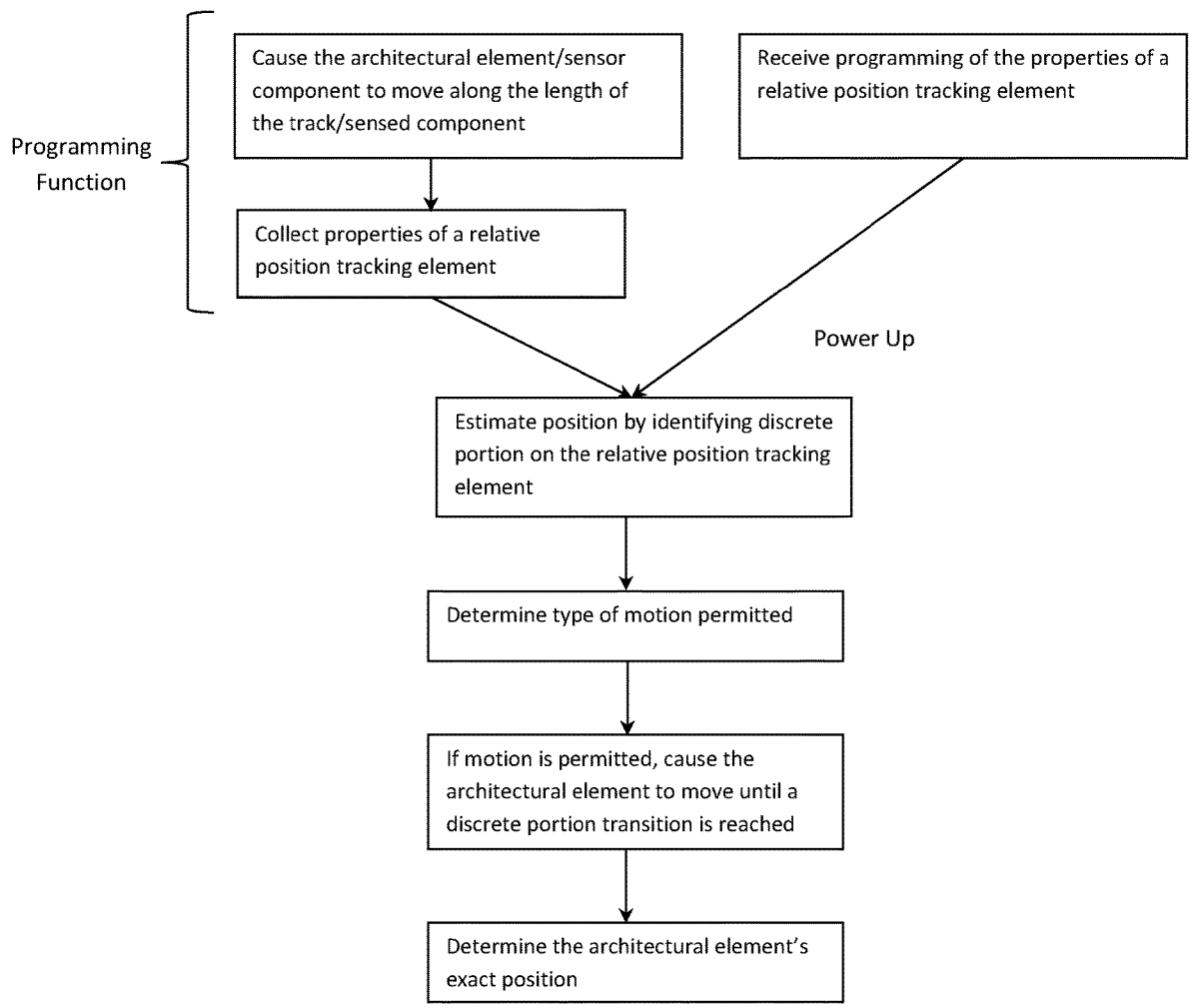
FIG. 8 is a flow chart of example operations performed by a position tracking module, according to various embodiments.

The programming function can be performed by the position tracking module 206 (see FIG. 2). FIG. 8 is a flowchart showing example operations of the position tracking module 206, including the programming function. The operations can include causing the architectural element 100/sensor component 116 to perform an initial movement (or, in some cases, multiple movements) along the length of the track 108/sensed component 118. In general, the architectural element 100/sensor component 116 can move along any length of the track 108/sensed component 118; for example, the architectural element 100/sensed component 118 can begin at a first end of the track 108/sensed component 118 and move to a second/opposite end of the track 108/sensed component 118.

During the initial movement(s), the sensor component 116 can collect information and obtain properties regarding the sensed component 118 (relative position tracking element) and store the information in a non-volatile memory. In general, any measurable information can be collected and stored. In some cases, the information includes the length of each discrete portion (e.g., color portions 118a, 118b, 118c on printed tape 118), the sequence of the discrete portions, and a total length of the sensed component 118. The length of each discrete portion and the total length can be measured using any technique, e.g., using the incremental positioning system 124. In some embodiments, the sequence of the discrete portions 118a, 118b, 118c can encode information about the type of system 10 that can be understood by the microprocessor 134 and/or controller 106. For example, the sequence of the discrete portions can function as a barcode or QR code. In general, any information can be communicated in this manner, e.g., size of the system, configuration of the system (e.g., furniture or other items included), desired speed profile, desired load profile, maximum speed, maximum load, power requirements, maintenance schedule, among many other examples.

Knowing the properties of the sensed component 118 (either via pre-programming, the programming function, etc.) can enable determination of position even when the system 10 is started (powered up) at a location in the middle of the track 108. For example, as shown in FIG. 8, upon startup of the system 10, the position tracking module 206 can estimate its position by identifying a discrete portion (e.g., color portion) on the sensed component (printed tape) 118. For example, by knowing what color portion the sensor component 116 is proximate/adjacent to and the length of the color portion, the position tracking module 206 knows its position is somewhere within that length. Based on the estimated position, the position tracking module 206 can decide if motion/what type of motion is permitted. For example, motion may not be permitted in a particular direction or at a particular speed if the element 100 is located near the end of the track 108 or another object. If motion is permitted, the position tracking module 206 can cause the element 100 to move until the sensor component 116 detects a color transition (or other discrete portion transition). In some implementations, during this motion, the incremental positioning system 124 is used to determine the distance it takes to reach the color transition, though this is not required in all implementations. Upon reaching the color transition, the position tracking module 206 can determine the element's exact position, e.g., based solely on knowledge of the properties of the sensed component 118, or based on knowledge of the properties of the sensed component 118 and the distance it took to reach the color transition. Once exact position is known, in some cases, the position tracking module 206 continues to track position using the incremental positioning system 124. The process can repeat if any event occurs such that the position tracking module 206 loses knowledge of the exact position, e.g., if the system 10 loses power, if the system 10 is manually moved, etc. In some implementations, the position tracking module 206 can only estimate position and not determine exact position. In such instances, the sensor component 116 may not include the incremental positioning system 124.

Another aspect of the invention relates to inventive techniques for distributing power to the various components of the system 10. As mentioned above, the moveable architectural element 100 is often moved via a drive element 102 that is driven by a powered motor 104. However, the system 10 is somewhat unique in that the item (or, in some cases, multiple items) requiring power can be mobile during operation of the system 10. This creates multiple complications, usage difficulties, and potential safety hazards. For example, simply running a power cord from a wall outlet to the motor and allowing the cord to travel as the architectural element 100 moves, can result in the cord being snagged or caught, which can result in damage to the system 10, damage to the cord, and even a fire.

Figure 9:
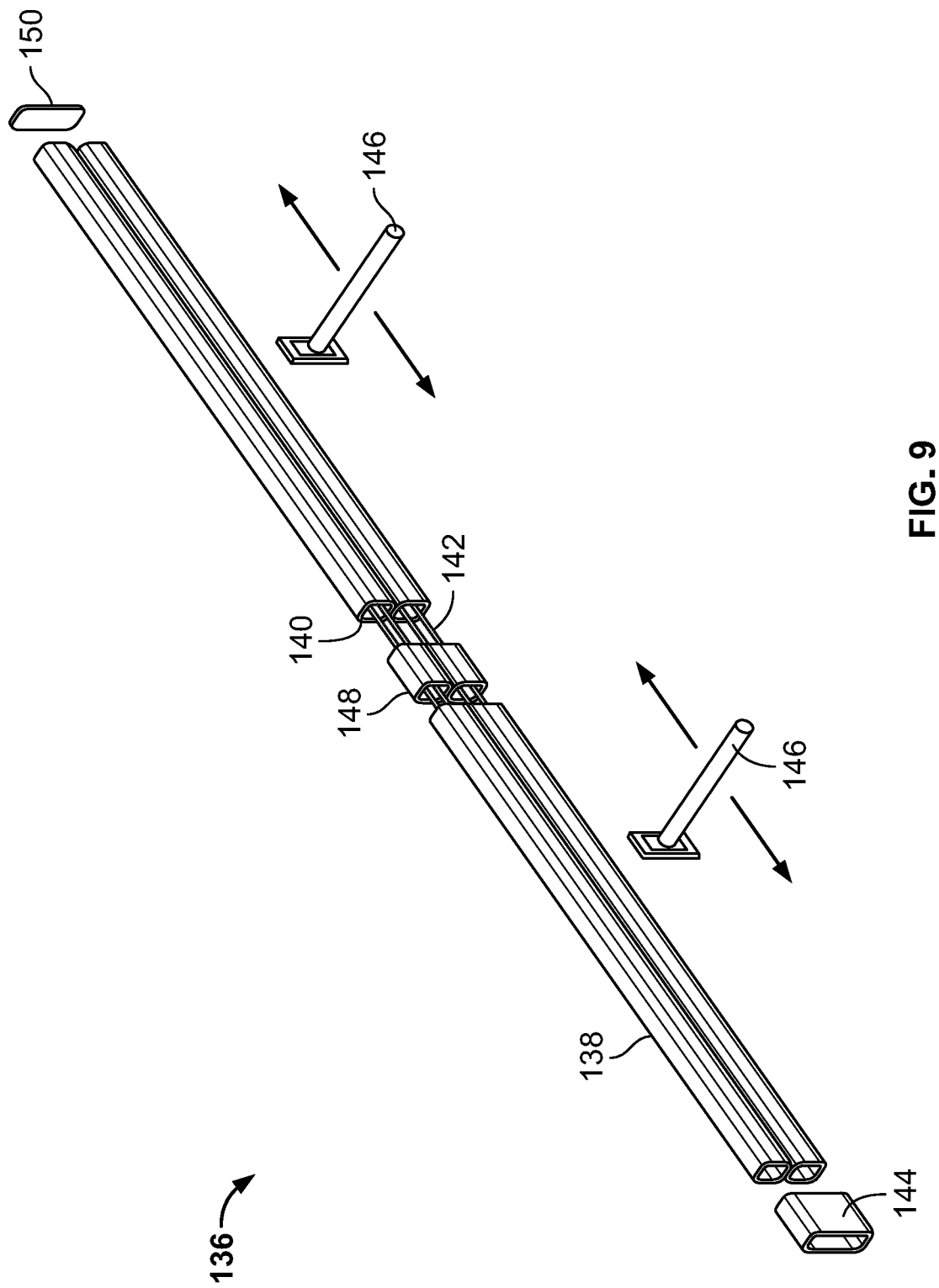
FIG. 9 is a schematic perspective view of a power distribution assembly, according to various embodiments.

In various implementations, the system 10 can include power distribution systems that are safer and more user friendly than conventional techniques. For example, as shown in FIG. 9, in some embodiment that system 10 can include a modular power distribution assembly 136. In some instances, the modular power distribution assembly 136 forms the track 108 shown in FIG. 1. The modular power distribution assembly 136 can include at least some of the following components: a housing 138, an insulating material 140 (e.g., polymeric), at least one conductive rail 142, at least one power entry module 144, at least one power exit module 146, a strain relief mechanism, a splice section 148, an end cap 150, and/or a mounting mechanism. Not every embodiment features all of these components, and some embodiments feature additional or different components.

In general, the modular power distribution assembly 136 can be mounted in any location such that is can distribute power to at least one moveable architectural element 100 of the system. For example, the power distribution assembly 136 can be mounted and/or located on a floor surface, a wall surface, a ceiling surface, and/or another architectural element or structural element. As mentioned, in some cases, the power distribution assembly forms or is located within the track 108 shown in FIG. 1. For example, the power distribution assembly 136 may be placed along a wall parallel to the floor to allow for horizontal movement, vertically (e.g., orthogonal to the floor) to allow for vertical movement, at an angle, or in some cases in a non-linear path, depending on the desired path of movement for the element 100.

The housing 138 may have an extruded profile that may be straight, curved or have a form that matches a particular profile. The housing 138 can limit access to the conductive rails (from humans and animals), making it suitable for use in home and office environments, and avoiding risks of electric shock or pinched fingers. The housing 138 can contain an insulated liner 140 or be formed from an insulating material (e.g., polymeric). In some cases, one or more energized conductive rails 142 extend lengthwise along and are surrounded by the housing 138. The rails 142 can carry electric current to the power exit module(s) 146. In some embodiments, the rails 142 provide a low impedance path, e.g., less than 0.1 Ohms to a protective earth ground. In some cases, each rail 142 is surrounded by an insulating material/liner 140. For example, if the housing 138 is made of an electrically conductive material, a layer of polymeric insulating material can coat each conductive rail 142 to insulate it from the housing 138. In some implementations, the housing 138 itself is made of a conductive material and can be used as a conductive rail 142.

In general, the power entry module 144 can include any device that can transfer power to the conductive rail(s) 142 and/or power exit module(s) 146. Although only a single power entry module 144 is shown in FIG. 9, any suitable number of power entry module(s) 144 can be included. In general, the power entry module 144 can be located at any location along the housing 138, e.g., at either end of the housing 138. In some cases, an end cap 150 is mounted to one or both ends of the housing 138 (e.g., an end without a power entry module 144) to prevent access to the conductive rails and to ensure that the power exit module(s) 146 are mechanically contained, e.g., for safety reasons. The power entry module 144 can include an input connector such that the power entry module 144 can be connected to the environment's AC electrical system, an auxiliary AC power source, and/or an auxiliary DC power source. The power entry module 144 can include internal routing that electrically couples the conductors of the input connector to the conductive rail(s) 142. The power entry module 144 may also mechanically enclose live parts that may be accessible on the input connector and internal routing. In some cases, the power entry module 144 and/or the end cap 150 is replaced with a standard power outlet (e.g., based on the region in which the assembly is installed).

Figure 10:
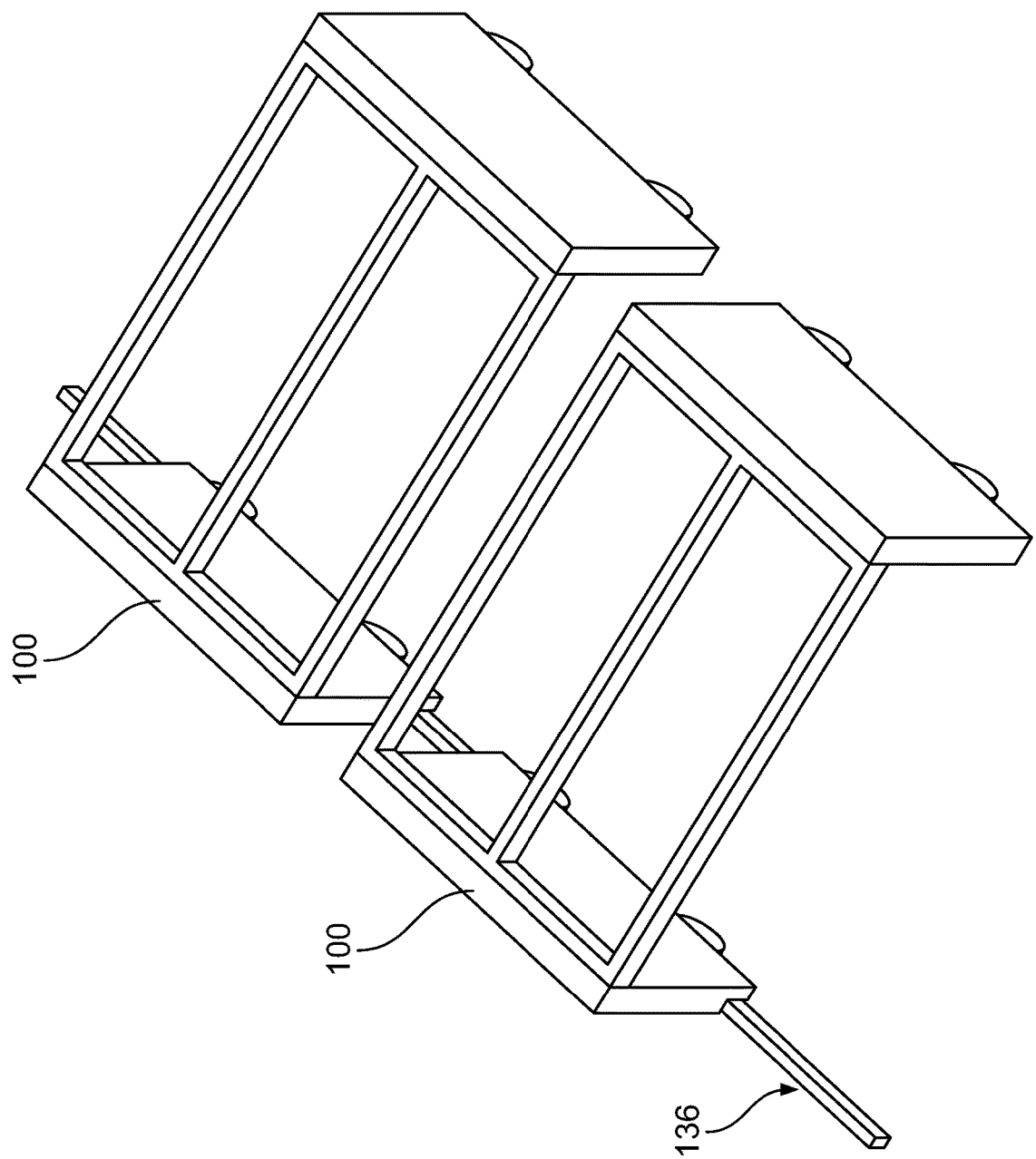
FIG. 10 is a schematic perspective view of a system including multiple moveable architectural elements, according to various embodiments.

In various implementations, one or more power exit modules 146 are moveably mounted within the housing 138 and provide multiple power access points. As mentioned above, in some configurations, the system 10 can include multiple moveable architectural elements 100 (e.g., 2, 3, 4, or more). In such configurations, a separate power exit module 146 can deliver power to each architectural element 100 (see FIG. 10). In other instances, a single power exit module 146 can deliver power to two or more architectural elements 100 (e.g., all of the architectural elements 100). In some configurations, one end of each power exit module 146 is contained within the housing 138 by, for example, inserting it within an open end of the housing 138 that is subsequently closed with the power input module 144 and/or the end cap 150. The other end of each power exit module 146 can extend outwardly away from the housing 138. The power exit module(s) 146 can each include an electrical coupling element (e.g., conductive element, printed wiring board, individual electrical wires, etc.) to route power from the conductive rail(s) 142 to a power output. The power exit module(s) 146 can also include a polymeric component that insulates the electrical contacts and provides them with a means of mechanical support.

In some configurations, a power cord can be used to transfer power from the power exit module 146 to the moveable architectural element 100. For example, the power cord can be routed starting at the conductive rail 142 or from an external power supply (e.g., a wall outlet). In such configurations, each power exit module 146 can include a strain relief mechanism to relieve strain on the cord of the power cable. For example, the strain relief mechanism can be attached to any or all of the moveable element(s) 100 to ensure that the power cable connected to the moveable element 100 does not feel any of the force used to move the power exit module(s) 146 along the track 108. Any type of strain relief can be used, e.g., a strain relief cord, a hook and eye device, and/or any mechanical attachment that transfers the force of moving the power exit module 146 to the moveable element 100.

In some implementations, the power distribution assembly 136 can include a splice section 148 that can be inserted between two lengths of a housing 138 to extend the length of the power distribution system 136. For example, power distribution assemblies 136 that exceed a predetermined length can be assembled with multiple housings 138 and at least one splice section 148. Among other advantages, this can enable easier shipping and assembly for assemblies that exceed a certain length. The splice section(s) 148 can have any configuration that enable power to be distributed from a first housing section to a second housing section. For example, each splice section 148 can include the same number of electrical contacts as the number of conductive rails 142 in the housings 138.

Any suitable mounting mechanism can be used to affix the power distribution assembly 136 to a built environment. For example, the mounting mechanism can include an adhesive strip between the housing 138 and the built environment, a mounting bracket between the housing 138, power entry module 144, and/or end cap 150 and the built environment, a high friction material between the housing 138 and the built environment, etc.

Figure 11A:
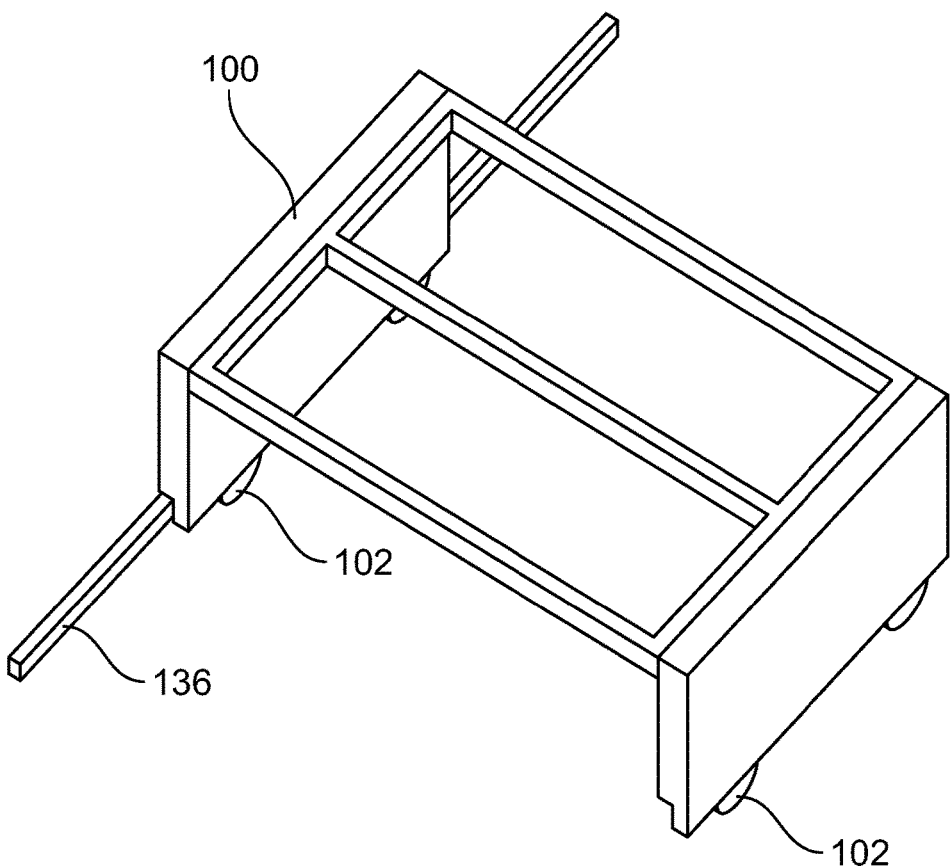
FIG. 11A is a top perspective view of a system including one power distribution assembly, according to various embodiments.
Figure 11B:
FIG. 11B is a schematic front view of the system shown in FIG. 11A.

In some configurations, the system 10 can be moved by multiple drive elements 102 (e.g., drive wheels), e.g., located at desirable locations based on the moment of inertia and desired movement profile of the architectural element 100. For example, one drive element 102 can be located on one side of the element 100 and another drive element 102 located on the other side of the element 100. In some cases, multiple drive elements 102 (e.g., multiple drive wheels) can be located on either side of the element 100. In some embodiments, as shown in FIGS. 11A-B, the power distribution assembly 136 only delivers power to one or some of the drive elements 102, but not all of the drive element 102. For example, the power distribution assembly 136 may only deliver power to motors 104 associated with the drive elements 102 on one side of the architectural element 100, but not to the other side of the element 100. In such instances, similar to the front wheels in a rear-wheel drive vehicle, the drive elements 102 that do not receive power can be indirectly moved by the drive elements 102 that do receive power. In such instances, the drive elements 102 that do not receive power can still travel along a track 108 to provide balance and/or guidance to the element 100. The sides of the element 100 need not be parallel as shown in FIG. 11A-B.

Figure 12A:
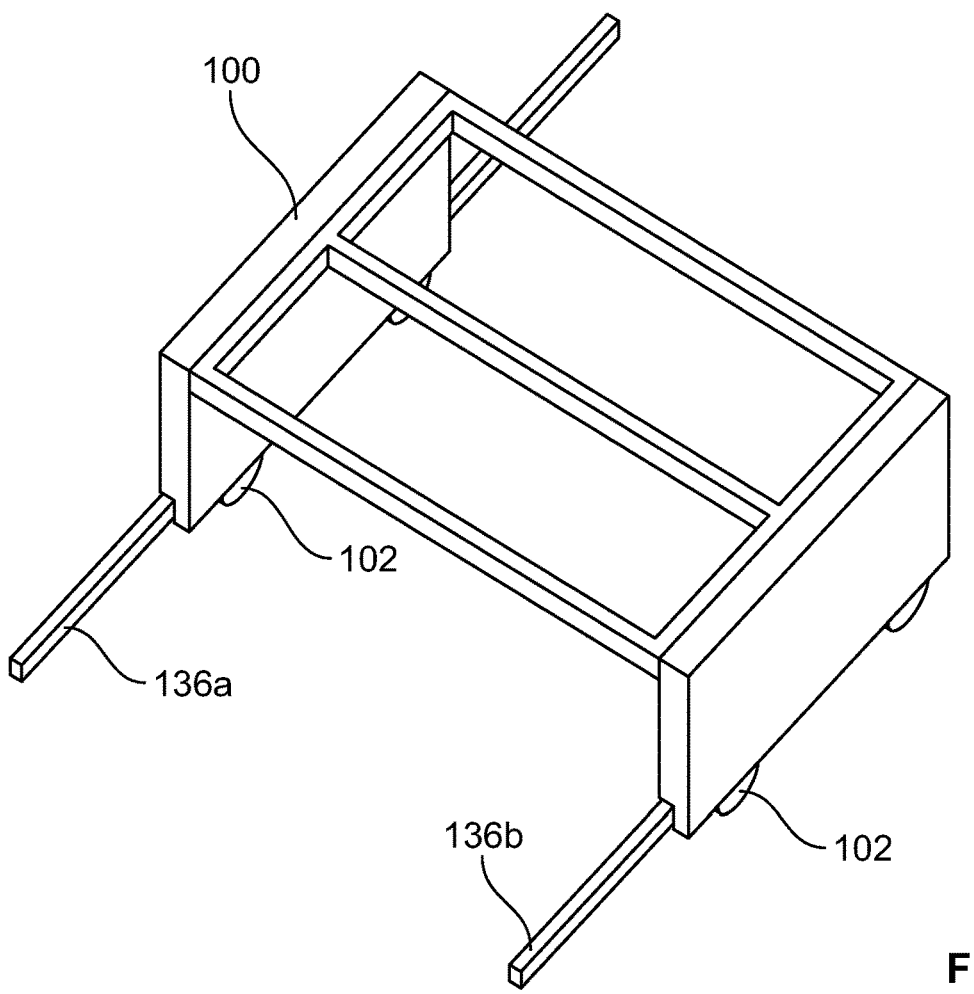
FIG. 12A is a top perspective view of a system including two power distribution elements, according to various embodiments.
Figure 12B:
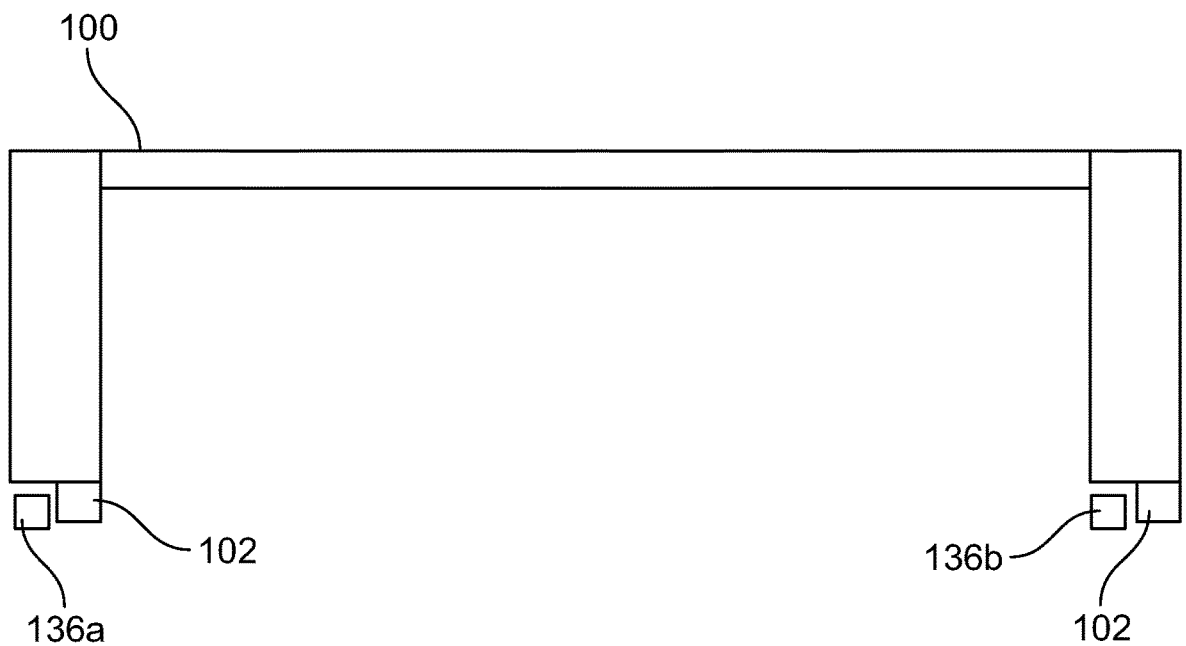
FIG. 12B is a schematic front view of the system shown in FIG. 12A.

In other implementations, the system 10 includes multiple power distribution assemblies 136 that deliver power to different drive elements 102. For example, as shown in FIGS. 12A-B, a first power distribution assembly 136a can deliver power to motors associated with drive elements 102 on a first side of the architectural element 100 and a second power distribution assembly 136b can deliver power to motors 104 associated with drive elements 102 on another side of the element 100. The sides of the element 100 need not be parallel, as shown in FIGS. 12A-B. In some instances, multiple power distribution assemblies 136 can deliver power to the same drive elements 102.

In some implementations, the moveable architectural element 100 itself can support additional power distribution assemblies 136 which may be parallel to, orthogonal to, at another angle to, or in non-linear relation with the primary power distribution assembly 136, thus creating a multi-axis system with powered movement along each axis. In some instances, the power exit module 146 from the primary power distribution assembly may provide the power input into a secondary power distribution assembly. In other instances, a cord may connect the two assemblies.

Figure 13:
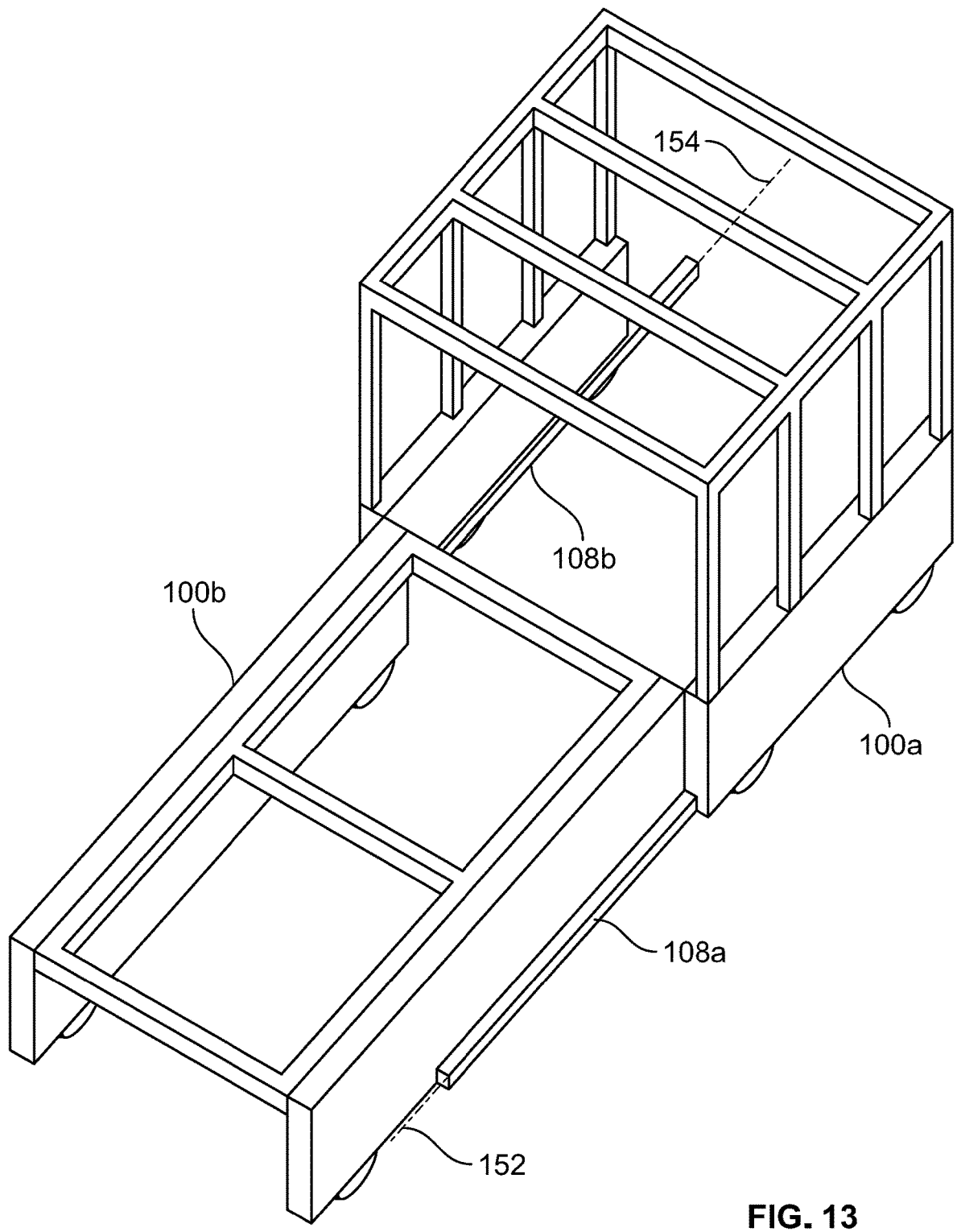
FIG. 13 is a schematic perspective view of a system including multiple tracks, according to various embodiments.

As mentioned, various embodiments of the system 10 include multiple moveable architectural elements 100. In some instances, a first moveable element 100a (e.g., a wall) can move along a first track 108a forming a first axis 152 and at least one additional moveable element 100b (e.g., a bed, a desk, a couch, a closet, a shelf, etc.) can be moved along a second track 108b forming a second axis 154. In some cases, the second track 108b is attached to the first moveable element 100a, as shown for example in FIG. 13. In general, the first axis 152 and the second axis 154 can be arranged at any angle with respect to each other, e.g., parallel (FIG. 13), perpendicular, and any other angle in any plane. In general, the first and second tracks 108a, 108b (and any additional tracks) can be arranged in any suitable configuration, e.g., adjacent to each other on one side of the system 10, on opposing sides of the system 10, or both. In some instances, the motions of each moveable element 100a, 100b can be independent of each other (in either the same or different directions). In other instances, the motions of each moveable element 100a, 100b can be dependent upon each other (in either the same or different directions). The motions of the moveable elements 100a, 100b can either be in unison or out of unison.

Figure 14A:
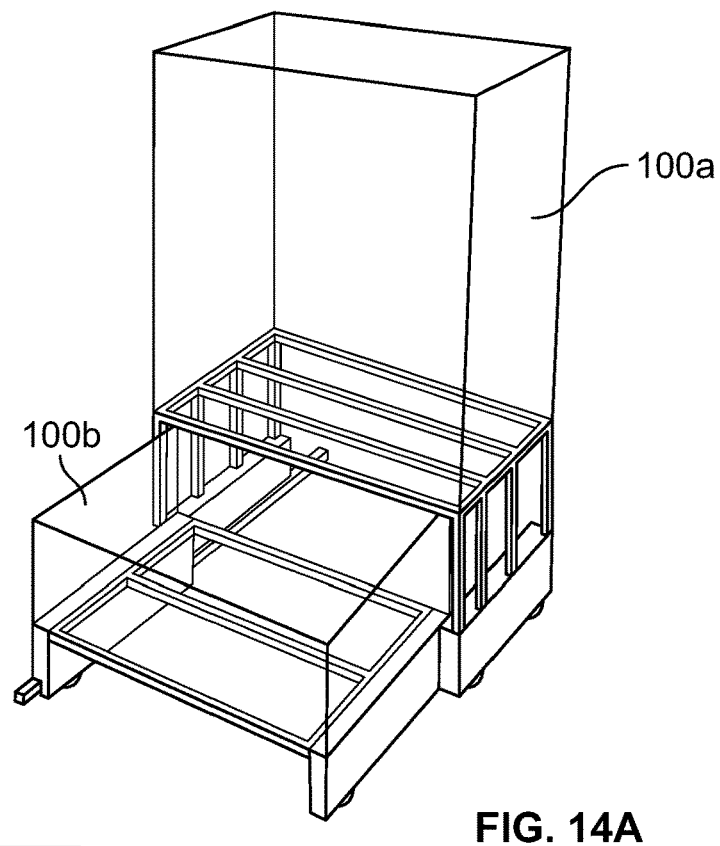
FIG. 14A is a schematic perspective view of a system including multiple moveable architectural elements in a nested configuration, according to various embodiments.
Figure 14B:
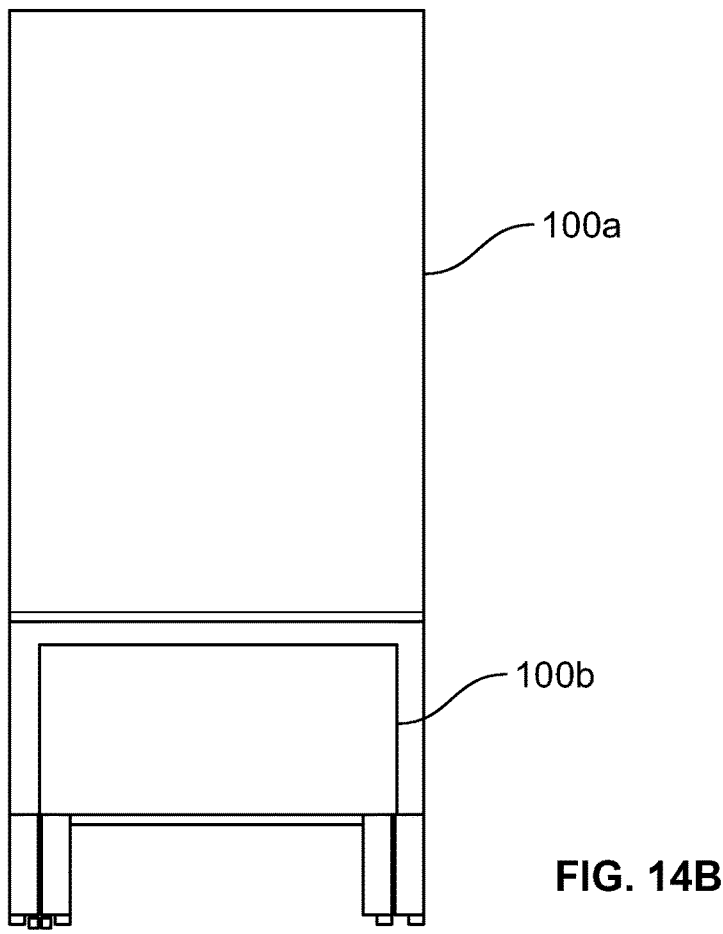
FIG. 14B is a schematic front view of the system shown in FIG. 14A.

In general, the first moveable element 100a can be arranged in any relation to the second moveable element 100b. For example, the elements 100a, 100b can be horizontally adjacent (see, e.g., FIG. 10), vertically adjacent, and/or nested (see, e.g., FIGS. 13, 14A-B). In some cases, both (or all) moveable elements can be driven by the same drive element 102. In other cases, the moveable elements are driven by different drive elements 102. In some cases, the different drive elements are of the same type (e.g., both motors 104 attached to drive wheels). In other cases, the different drive elements are different from each other. For example, in some configurations, a first moveable element 100a can be driven by a motor 104 and a second moveable element 100b can be driven by a friction drive 156. A friction drive can take any known form, including for example a drive wheel.

Figure 15:
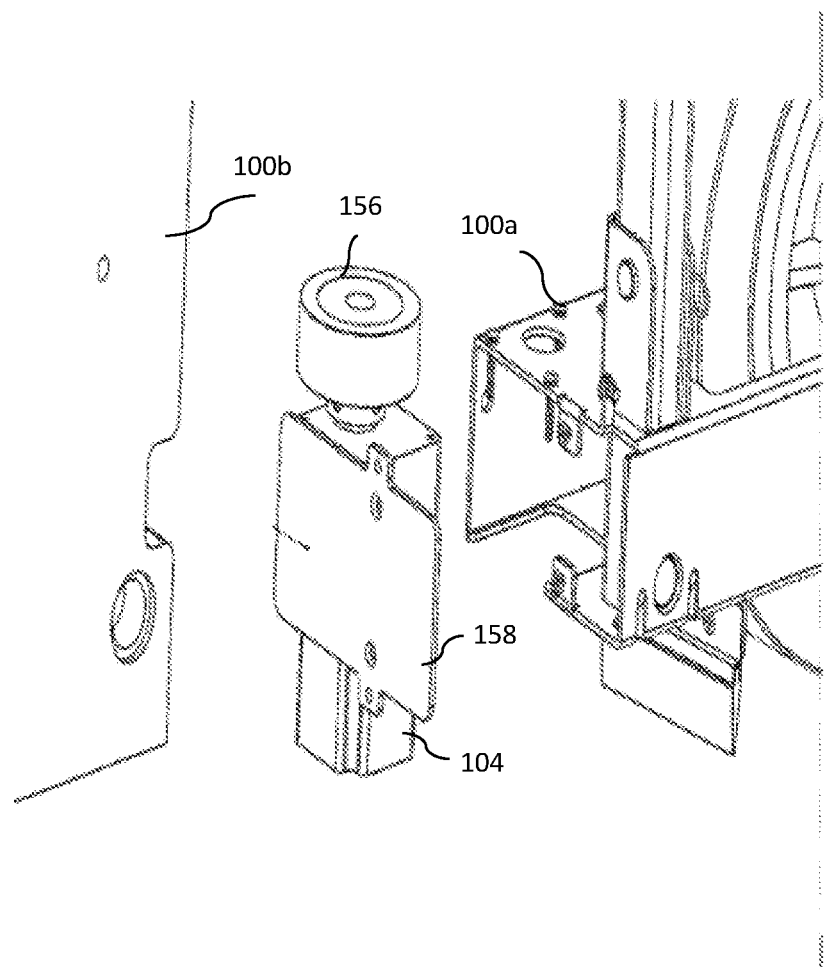
FIG. 15 is a schematic perspective view of a system including a motor drive and a friction drive, according to various embodiments.

An example of this configuration is shown in FIG. 15. In some cases, the friction drive 156 eliminates the need to route power to an additional moving element, allows for ease of integration, on-site assembly/servicing, and/or lowers the cost of the system 10. Further, due to the variability of the installation environments (e.g., floor variations, wall misalignments, etc.) the moveable elements can be subject to misalignment and the friction drive 156 can offer increased resistance to such misalignment and an unlimited travel length.

Figure 16:
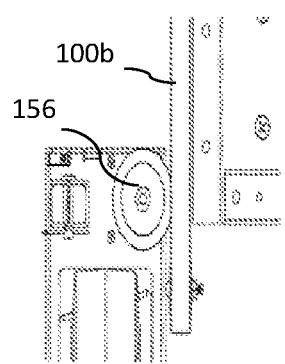
FIG. 16 is a schematic top view of a system including a friction drive, according to various embodiments.

As shown in FIG. 15, the configuration can also include an adjustable mounting bracket 158. The drive wheel 156 can be rigidly coupled to the motor 104, and the motor 104 can be rigidly mounted to the adjustable mounting bracket 158. The adjustable mounting bracket can be adjusted in reference to the first moveable element 100*a* (e.g., wall chassis) during installation or servicing to tune the amount of force the drive wheel 156 exerts on the second moving element 100*b* (e.g., furniture element), thus allowing the friction drive 156 to perform well over a wide range of manufacturing and assembly tolerances in the system, as well as to account for wear over time. FIG. 16 shows the drive wheel 156 in contact with the second moveable element 100*b*. In some embodiments, one of the moveable elements 100*a*, 100*b* remains stationary and only the other moveable element moves; for example, under any of the drives described above (e.g., motor drive, friction drive, etc.)

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a smart phone, a smart watch, a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Each numerical value presented herein is contemplated to represent a minimum value or a maximum value in a range for a corresponding parameter. Accordingly, when added to the claims, the numerical value provides express support for claiming the range, which may lie above or below the numerical value, in accordance with the teachings herein. Every value between the minimum value and the maximum value within each numerical range presented herein, is contemplated and expressly supported herein, subject to the number of significant digits expressed in each particular range. Absent inclusion in the claims, each numerical value presented herein is not to be considered limiting in any regard.

Unless expressly described elsewhere in this application (e.g., the use of the word "substantially" with respect to a geometric shape), as used herein, when the term "substantially" or "about" is before a quantitative value, the present disclosure also includes the specific quantitative value itself, as well as a ±10% variation from the nominal value unless otherwise indicated or inferred.

The terms and expressions employed herein are used as terms and expressions of description and not of limitation and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The structural features and functions of the various embodiments may be arranged in various combinations and permutations, and all are considered to be within the scope of the disclosed invention. Unless otherwise necessitated, recited steps in the various methods may be performed in any order and certain steps may be performed substantially simultaneously. Accordingly, the described embodiments are to be considered in all respects as only illustrative and not restrictive. Furthermore, the configurations described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A method of operating a furniture item to move within a room to reconfigure the room, the method comprising:
    identifying a desired movement profile of the furniture item along a surface of the room;
    performing an initial movement of the furniture item along the surface of the room using a motor, the initial movement is performed to move the furniture item from a first location to a second location in the room according to the desired movement profile;

generating and storing a profile of an operation parameter, wherein the profile of the operation parameter comprises a number of values of the operation parameter that are collected during the initial movement;

upon performing a subsequent movement of the furniture item after the initial movement, measuring an indicator of the operation parameter and determining a measured operation parameter based on the indicator of the operation parameter;

comparing a value of the measured operation parameter to a corresponding value of the number of values of the operation parameter in the profile of the operation parameter;

if a differential between the value of the measured operation parameter and the corresponding value of the operation parameter in the profile of the operation parameter exceeds a predetermined threshold, adjusting the subsequent movement of the furniture item; and updating the profile of the operation parameter by replacing at least one of the number of values of the operation parameter in the profile of the operation parameter with the corresponding value of the measured operation parameter.

2. The method of claim 1, wherein the desired movement profile comprises at least one of a speed profile and an acceleration profile.

3. The method of claim 1, wherein the desired movement profile is based on a desired motor parameter profile.

4. A system for operating a furniture item to move within a room to reconfigure the room, the system comprising:

a motor adapted to move the furniture item along a surface of the room;

at least one of a controller and a data processing apparatus, programmed to perform operations comprising:

obtaining a desired movement profile of the furniture item along the surface of the room;

performing an initial movement of the furniture item along the surface of the room using the motor, the initial movement is performed to move the furniture item from a first location to a second location in the room according to the desired movement profile;

generating a profile of an operation parameter, wherein the profile of the operation parameter comprises a number of values of the operation parameter that are collected during the initial movement;

upon performing a subsequent movement of the furniture item after the initial movement, measuring an indicator of the operation parameter and determining a measured operation parameter based on the indicator of the operation parameter;

comparing a value of the measured operation parameter to a corresponding value of the number of values of the operation parameter in the profile of the operation parameter;

if a differential between the value of the measured operation parameter and the corresponding value of the operation parameter in the profile of the operation parameter exceeds a predetermined threshold, adjusting the subsequent movement of the furniture item; and updating the profile of the operation parameter by replacing at least one of the number of values of the operation parameter in the profile of the operation parameter with the corresponding value of the measured operation parameter; and a memory unit for storing the profile of the operation parameter.

5. The system of claim 4, wherein the desired movement profile comprises at least one of a speed profile and an acceleration profile.

6. The system of claim 4, wherein the desired movement profile is based on a desired motor parameter profile.

7. The system of claim 6, wherein the desired motor parameter profile comprises at least one of a load profile, a speed profile, a voltage profile, a current profile, and a pulse width modulation profile.

8. The system of claim 4, wherein the operation parameter comprises at least one of a load on the motor, a speed of the motor, a voltage delivered to the motor, a current delivered to the motor, and a pulse width modulation delivered to the motor.

9. The system of claim 8, wherein the operation parameter comprises the load on the motor and wherein the load on the motor is measured as an alignment angle value.

10. The system of claim 4, wherein the indicator of the operation parameter is the same as the measured operation parameter.

11. The system of claim 4, wherein the indicator of the operation parameter is different than the measured operation parameter.

12. The system of claim 4, wherein the adjusting the subsequent movement of the furniture item comprises at least one of stopping the subsequent movement, reducing a speed of the subsequent movement, and reversing a direction of the subsequent movement.

13. The system of claim 4, wherein the furniture item comprises a wall.

14. The system of claim 4, wherein the motor comprises at least one of an electric DC motor and a stepper motor.

15. The system of claim 4, wherein the motor moves the furniture item via a drive wheel and the surface of the room comprises a distance over which the drive wheel travels.

16. The system of claim 15, wherein the surface of the room is selected from a group consisting of a floor surface, a wall surface, and a ceiling surface.

17. The system of claim 16, wherein the operation parameter varies along the surface of the room at least in part because of imperfections on the surface of the room.

18. The system of claim 17, wherein the imperfections comprise at least one of an incline surface, a decline surface, and variable friction along the surface of the room.

19. The system of claim 4, wherein the operations further comprise:

instructing the motor to perform an additional movement of the furniture item along at least a portion of the surface of the room;

updating the profile of the operation parameter based on additional values of the operation parameter measured during the additional movement.

* * * * *